(12) United States Patent
Valaee et al.

(10) Patent No.: US 12,413,456 B2
(45) Date of Patent: Sep. 9, 2025

(54) PARALLEL DIRECT-FEEDBACK DECISION-FEEDBACK EQUALIZER FOR HIGH-SPEED LOW-VOLTAGE WIRELINE LINKS

(71) Applicant: QUALCOMM Incorporated, San Diego, CA (US)

(72) Inventors: Darius Valaee, San Diego, CA (US); Patrick Isakanian, El Dorado Hills, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 73 days.

(21) Appl. No.: 18/487,474

(22) Filed: Oct. 16, 2023

(65) Prior Publication Data

US 2025/0125999 A1    Apr. 17, 2025

(51) Int. Cl.
*H04L 25/03* (2006.01)
*H04L 25/02* (2006.01)

(52) U.S. Cl.
CPC .... *H04L 25/03057* (2013.01); *H04L 25/0272* (2013.01); *H04L 25/03267* (2013.01)

(58) Field of Classification Search
CPC .......... H04L 25/0272; H04L 25/03019; H04L 25/03057; H04L 25/03108; H04L 25/03146; H04L 25/03254; H04L 25/03267; H04L 25/03885; H04L 2025/03433; H04L 2025/0349

USPC ................. 375/231–233, 350; 708/322, 323
See application file for complete search history.

(56) References Cited

U.S. PATENT DOCUMENTS

| | | | |
|---|---|---|---|
| 9,876,656 B1 | 1/2018 | Freitas | |
| 10,523,472 B1* | 12/2019 | Zhao | ................... H04L 25/0328 |
| 2018/0343149 A1* | 11/2018 | Kim | ................... H04L 25/03885 |
| 2022/0068359 A1* | 3/2022 | Shin | ..................... G11C 11/4074 |
| 2022/0166652 A1* | 5/2022 | Soni | ........................ H03K 5/133 |

OTHER PUBLICATIONS

International Search Report and Written Opinion—PCT/US2024/049648—ISA/EPO—Jan. 9, 2025.

* cited by examiner

*Primary Examiner* — Young T. Tse
(74) *Attorney, Agent, or Firm* — Loza & Loza, LLP

(57) ABSTRACT

A method for equalizing a data signal includes providing a data signal to a pair of input transistors that provides an output signal, contributing to the output signal, a first current or voltage that has a magnitude determined by a first weighted feedback signal using a first decision-feedback circuit that includes a first pullup circuit coupled to a drain of a first input transistor, and a first pulldown circuit coupled to the drain of the first input transistor, and contributing to the output signal, a second current or voltage that has a magnitude determined by a second weighted feedback signal using a second decision-feedback circuit that includes a second pullup circuit coupled between a drain of a second input transistor and the first voltage rail, and a second pulldown circuit coupled between the drain of the second input transistor and a second voltage rail.

26 Claims, 11 Drawing Sheets

PARALLEL DIRECT-FEEDBACK DECISION-FEEDBACK EQUALIZER FOR HIGH-SPEED LOW-VOLTAGE WIRELINE LINKS

TECHNICAL FIELD

The present disclosure generally relates to equalization circuits in receiving devices and, more particularly, to a decision-feedback equalizer that mixes feedback in parallel.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high-speed bus interface for communication of signals between hardware components. For example, the high-speed bus interface may be implemented using a Peripheral Component Interconnect Express (PCIe) bus. High frequency signals being communicated using the bus interface may experience attenuation. Therefore, an amplifier and equalizer at the receiver may be used to equalize and then amplify a signal received via the bus interface for processing.

SUMMARY

Certain aspects of the disclosure relate to systems, apparatus, methods and techniques for equalizing data signals. A differential data signal may be transmitted over a communication channel to receiver. The receiver may include one or more decision-feedback equalizers that provide parallel mixing of feedback.

In various aspects of the disclosure, a decision-feedback equalizer includes a pair of input transistors configured to receive a differential data signal and configured to provide an output signal, a first decision-feedback circuit and a second decision-feedback circuit. The first decision-feedback circuit includes a first pullup circuit coupled between a drain of a first input transistor and a first voltage rail and configured to contribute, to the output signal, a first current or voltage that has a magnitude determined by a feedback signal and a first weighting signal, and a first pulldown circuit coupled between the drain of the first input transistor and a second voltage rail and configured to contribute, to the output signal, a second current or voltage that has a magnitude determined by the feedback signal and a second weighting signal. The second decision-feedback circuit includes a second pullup circuit coupled between a drain of a second input transistor and the first voltage rail and configured to contribute, to the output signal, a third current or voltage that has a magnitude determined by the feedback signal and a third weighting signal, and a second pulldown circuit coupled between the drain of the second input transistor and a second voltage rail and configured to contribute, to the output signal, a fourth current or voltage that has a magnitude determined by the feedback signal and a fourth weighting signal.

In various aspects of the disclosure, a decision-feedback system includes a first decision-feedback equalizer configured to receive a data signal and to provide a first output signal representative of a first data bit captured from the data signal and a second decision-feedback equalizer configured to receive the data signal and to provide a second output signal representative of a second data bit captured from the data signal using weighted feedback received from the first decision-feedback equalizer. The first decision-feedback equalizer includes a pair of input transistors configured to receive the data signal and to drive the first output signal. The first decision-feedback equalizer further includes a first decision-feedback circuit that has a first pullup circuit coupled between a drain of a first input transistor and a first voltage rail and configured to contribute, to the first output signal, a first current or voltage that has a magnitude determined by a first feedback signal and a first weighting signal; and a first pulldown circuit coupled between the drain of the first input transistor and a second voltage rail and configured to contribute, to the output signal, a second current or voltage that has a magnitude determined by the first feedback signal and a second weighting signal. The first decision-feedback equalizer further includes a second decision-feedback circuit that has a second pullup circuit coupled between a drain of a second input transistor and the first voltage rail and configured to contribute, to the second output signal, a third current or voltage that has a magnitude determined by a second feedback signal and a third weighting signal; and a second pulldown circuit coupled between the drain of the second input transistor and a second voltage rail and configured to contribute, to the second output signal, a fourth current or voltage that has a magnitude determined by the second feedback signal and a fourth weighting signal.

In various aspects of the disclosure, a method for equalizing a data signal includes providing a differential data signal to a pair of input transistors configured to provide an equalized output signal, contributing to the equalized output signal, a first current or voltage that has a magnitude determined by a feedback signal and one or more weighting signals using a first decision-feedback circuit that includes a first pullup circuit coupled between a drain of a first input transistor and a first voltage rail, and a first pulldown circuit coupled between the drain of the first input transistor and a second voltage rail, and contributing to the equalized output signal, a second current or voltage that has a magnitude determined by the feedback signal and the one or more weighting signals using a second decision-feedback circuit that includes a second pullup circuit coupled between a drain of a second input transistor and the first voltage rail, and a second pulldown circuit coupled between the drain of the second input transistor and a second voltage rail.

In one aspect, the first pullup circuit and the second pulldown circuit are enabled when the feedback signal is in a first signaling state. The first pulldown circuit and the second pullup circuit may be enabled when the feedback signal is in a second signaling state.

In one aspect, the first weighting signal is a version of the third weighting signal and the second weighting signal is a version of the fourth weighting signal.

In one aspect, the first weighting signal, the second weighting signal, the third weighting signal and the fourth weighting signal are calibrated during a system initialization or training procedure. In one example, the first weighting signal, the second weighting signal, the third weighting signal or the fourth weighting signal is an analog signal. In one example, the first weighting signal, the second weighting signal, the third weighting signal or the fourth weighting signal is a multibit digital signal.

In one aspect, the decision-feedback equalizer includes one or more additional decision-feedback circuits connected in parallel with the first decision-feedback circuit, each additional decision-feedback circuit having an additional pullup circuit coupled between the drain of the first input transistor and the first voltage rail and configured to contribute, to the output signal, an additional current or voltage that has a magnitude determined by the feedback signal and a first additional weighting signal; and an additional pulldown circuit coupled between the drain of the first input transistor and the second voltage rail and configured to contribute, to the output signal, an additional current or voltage that has a magnitude determined by the feedback signal and a second additional weighting signal.

In one aspect, the decision-feedback equalizer includes a latch circuit configured to output a first decoded data bit by capturing signaling state of the output signal during a first transmission interval. The feedback signal may represent a second decoded data bit captured during a second transmission interval that preceded the first transmission interval.

DETAILED DESCRIPTION

Figure 1:
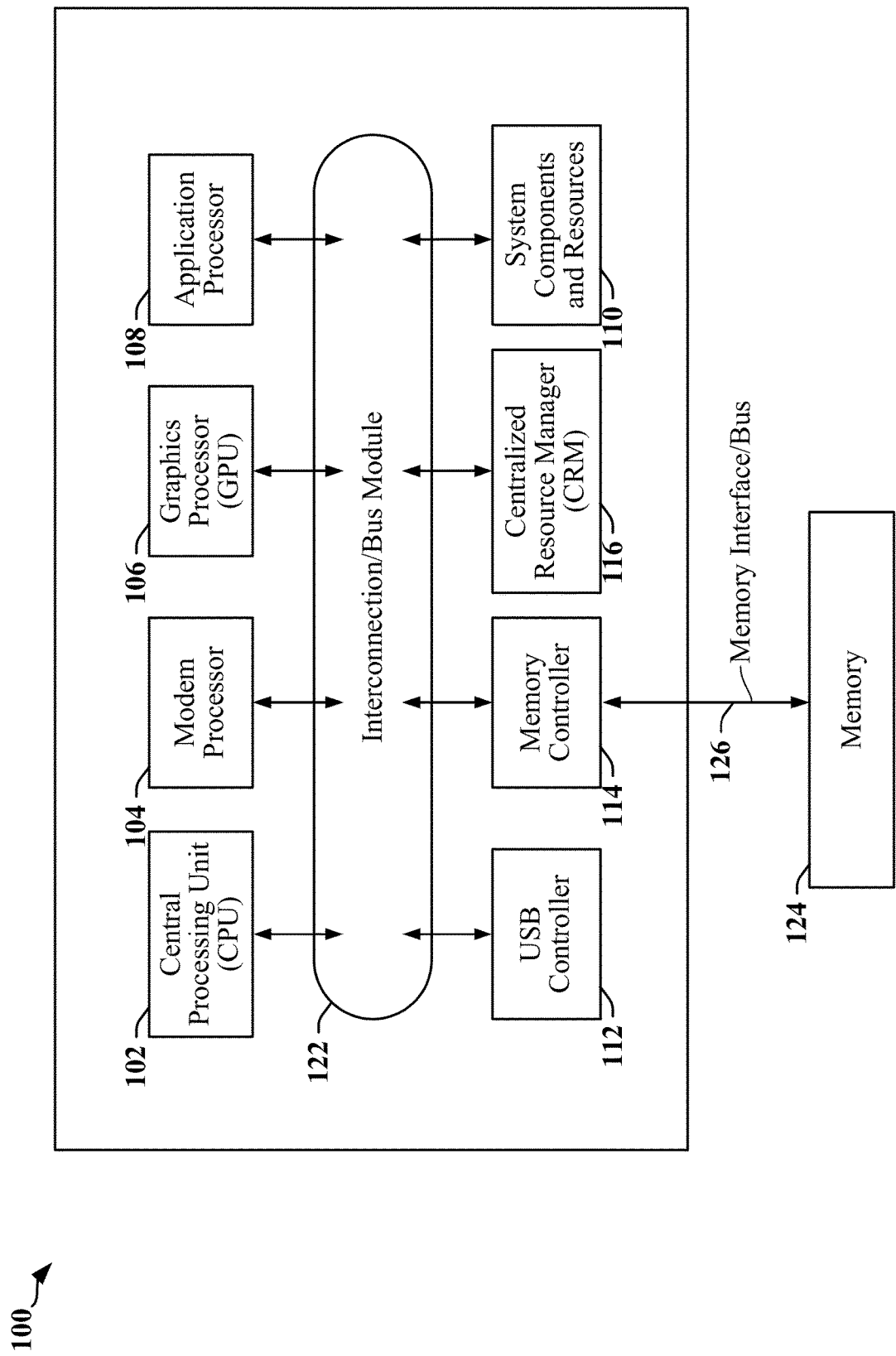
FIG. 1 illustrates an example of a system-on-a-chip (SOC) in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, notebooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Certain aspects of the disclosure are applicable to input/output (I/O) circuits that provide an interface between core circuits and memory devices. Many mobile devices employ Synchronous Dynamic Random Access Memory (SDRAM), including Low-Power Double Data Rate SDRAM, which may be referred to as DDR SDRAM, low-power DDR SDRAM, LPDDR SDRAM or, in some instances, LPDDRx where x describes the technology generation of the LPDDR SDRAM. Later generations of LPDDR SDRAM designed to operate at higher operating frequencies may employ lower voltage levels in the core of an SoC or memory device to mitigate for increased power associated with the higher operating frequencies.

Certain aspects of the disclosure are applicable to circuits that generate, transmit, receive, process and/or propagate differential signals. A differential signal pair comprises two signals that are phase-shifted from each other by 180°. The signals in the differential signal pair may be referred to as complementary signals. The differential signal pair is transmitted over wires, connectors, interconnects or other conductors using voltages of equal voltage magnitude and opposite polarity. A received signal that represents the difference between the differential signal pair can be generated at a receiving device. Common-mode noise affecting wires, connectors, interconnects or other conductors can be expected to induce a near-identical interference signal in the received differential signal pair, and the interference signal is typically cancelled at the receiver and does not affect the received signal.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

Certain aspects of this disclosure relate to circuits used in a high-speed serializer-deserializer (SERDES). Circuits are described that can be deployed in the analog front-end (AFE) of a receiver. In one example, some aspects of the disclosure relate to decision-feedback equalizers that include a plurality of decision-feedback circuits in parallel with the data input circuit of a receiving device.

FIG. 1 illustrates example components and interconnections in a system-on-chip (SoC) 100 that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high-performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from a memory 124 via a memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Figure 2:
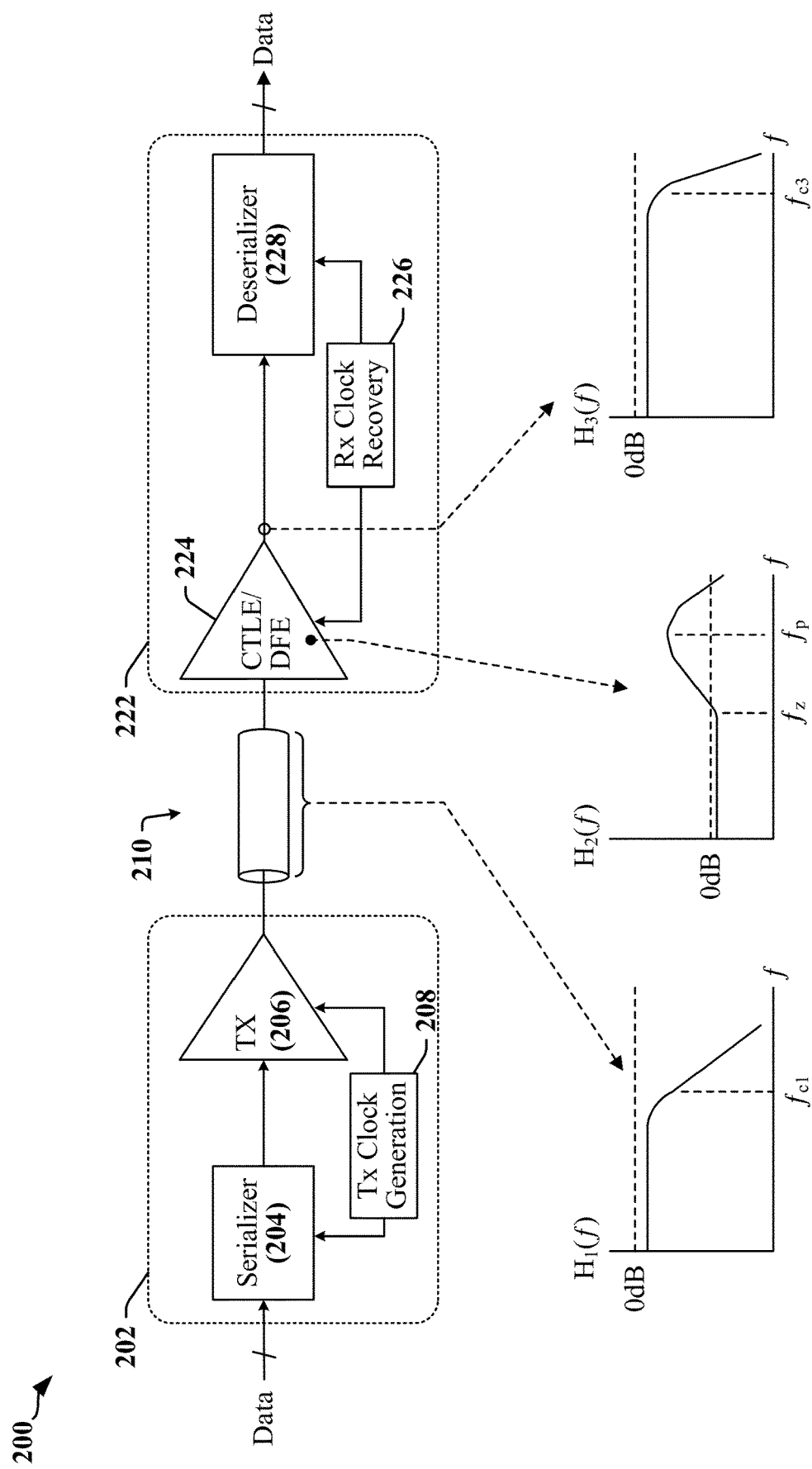
FIG. 2 illustrates an example of a data communication system that may be adapted in accordance with certain aspects of the present disclosure.

FIG. 2 illustrates an example of a data communication system 200 that may be adapted in accordance with certain aspects of the present disclosure. The data communication system 200 includes a transmitter 202, a data communication channel 210, and a receiver 222. The transmitter 202 may be provided in a first device that is configured to transmit a data signal to a second device. The data communication channel 210 provides a transmission medium through which the data signal propagates from the first device to the second device. The receiver 222 may be provided in the second device and may be configured to receive and process the data signal.

In one example, the transmitter 202 includes a serializer 204 configured to convert parallel data into serial data. The transmitter 202 further includes a transmit driver 206 configured to generate a data signal based on the serial data for transmission to the receiver 222 through the data communication channel 210. The serializer 204 and the transmit driver 206 may operate in accordance with one or more transmitter clock signals provided by a transmitter clock generation circuit 208. In some examples, the transmitter clock generation circuit 208 is implemented using a PLL.

The data communication channel 210 may be implemented using any type of transmission medium by which a data signal can propagate from the transmitter 202 to the receiver 222. Examples of the data communication channel 210 includes one or more metallization traces (which may include one or more vias) on a printed circuit board (PCB), stripline, microstrip, coaxial cable, twisted pair, etc.

In the illustrated example, the receiver 222 includes a variable gain amplifier (VGA), a clock data recovery circuit (the CDR 226) and a deserializer 228. The VGA may be incorporated in or be coupled to an equalizer such as a continuous time linear equalizer (CTLE). CTLE may refer to techniques for boosting the higher frequency components of the signal at the receiver in order to bring all frequency components of the signal to a similar amplitude ratio after channel attenuation, improving jitter and eye-diagram performance. In some implementations, the receiver 222 includes a decision-feedback equalizer (DFE). A DFE is a nonlinear equalizer that can be configured to flatten channel response and limit signal distortion without introducing noise or crosstalk that can occur with equalizers that operate using amplification of received signals. As disclosed herein, the CTLE 224 is configured to perform equalization and amplification of the received data signal. The CDR 226 is configured to recover a clock associated with the data signal and use the clock to recover the serial data from the data signal. The deserializer 228 receives one or more clock signals from the CDR 226 and further receives a series of recovered data bits output by the CDR 226. The deserializer 228 may be configured to convert the serial data back into parallel data. In one example, the deserializer 228 includes one or more shift registers that can accumulate a quantity of recovered data bits, which can be provided as a data byte, data word or some other unit of parallel data.

The data communication channel 210 typically has a frequency response $H_1(f)$ that is similar to a low pass filter. For instance, the frequency response $H_1(f)$ has relatively low losses from direct current (DC) up to a particularly cutoff frequency $f_{c1}$; then the losses increase above the cutoff frequency $f_{c1}$. The frequency response $H_1(f)$ of the data communication channel 210 limits the data rate at which data may be sent through the channel. If the Nyquist rate of the data signal is above the cutoff frequency $f_{c1}$, the data signal exhibits distortion at the receiver 222, which may be characterized as the eye in a signal eye diagram closing or getting smaller, making it difficult to recover the clock and the data by the CDR 226.

In the illustrated example, the CTLE 224 may perform equalization and amplification to increase the high frequency components of the data signal in order to increase the data rate at which the data signal may be sent through the data communication cable and reliably recovered at the receiver 222. For example, the CTLE 224 may be configured to provide a frequency response $H_2(f)$ that is substantially flat from DC up to a frequency $f_z$ corresponding to a Zero. Then, above the zero frequency $f_z$, the frequency response $H_2(f)$ of the CTLE 224 increases up to a frequency $f_p$ corresponding to a pole. Above the pole frequency $f_p$, the frequency response $H_2(f)$ of the CTLE 224 decreases. In some examples, the CTLE 224 may have more than one pole and one zero.

Figure 3:
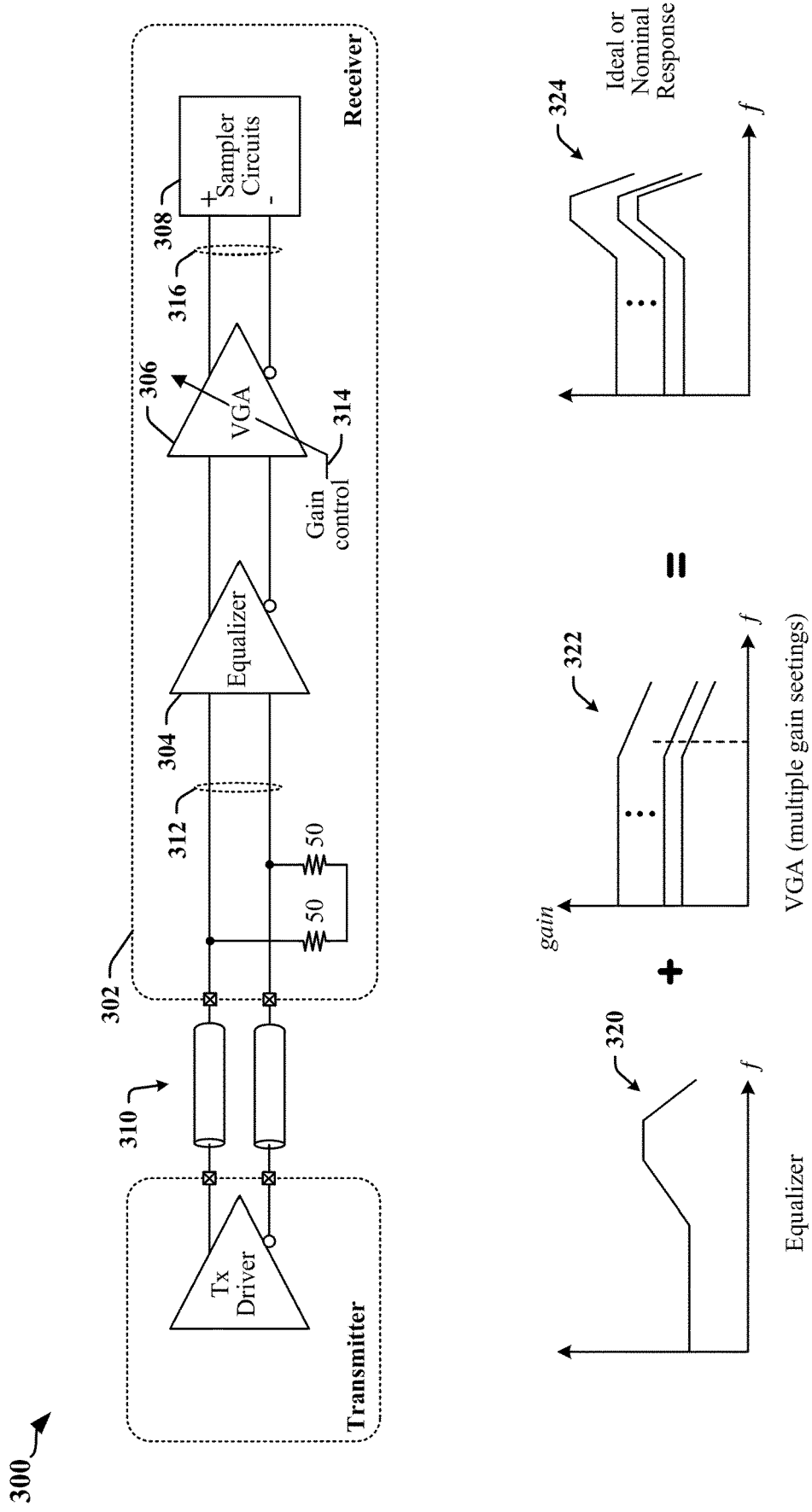
FIG. 3 illustrates certain aspects of a data communication interface that may be implemented in an SoC or in another IC device.

FIG. 3 illustrates certain aspects of a data communication interface 300 that may be implemented in an SoC or in another IC device. The receiver 302 in the data communication interface 300 includes differential signal processing circuits, including an equalizer 304 and a variable gain amplifier 306. The differential signal processing circuits can be configured to generate a differential output signal 316 by applying a frequency-dependent gain to a differential input signal 312, which is received from a differential communication channel 310 in the illustrated example. The differential output signal 316 may be provided to sampler circuits 308 configured to extract data and other information transmitted over the communication channel 310. In one example, the differential input signal 312 is applied to gate inputs or other control inputs of a pair of input transistors in the equalizer 304 and the output of the equalizer 304 is provided to the VGA 306. The gain of the VGA 306 is configurable through a gain control input 314. In one example, the gain control input 314 may include a 4-bit binary value that selects a gain setting from among 16 possible settings.

In the receiver 302, the VGA 306 cooperates with the equalizer 304 to equalize and amplify a small differential input signal 312 to a level that can be processed by a next stage. Ideally, the frequency response 320 of the equalizer 304 and the frequency response 322 of the VGA 306 produce an ideal combined frequency response 324 for each gain setting of the VGA 306. In the ideal situation the responses are substantially parallel for multiple gain settings in the combined frequency response 324. Parallel responses are indicative of consistent frequency response regardless of gain setting. A consistent equalization frequency response is typically desired regardless of the gain configured for the VGA 306. For example, the same equalization frequency response is typically desired for low amplitude signals and high amplitude signals, including when different gain settings are configured for the two signals.

In high-speed applications, data throughput of a serial data link may be limited by the characteristics of the channel used to carry data signals. Impedance mismatches, parasitic electromagnetic coupling and other factors can cause signal distortion. In many implementations, equalization circuits and capabilities are included in I/O circuits to compensate for signal distortions attributable to inter-symbol interference (ISI) and other effects that can combine to limit bandwidth in a channel. ISI can result when a first-received symbol interferes with subsequently received symbols due to reflections, frequency-dependent delays and other imperfections in the channel. A symbol may refer to signaling state within a unit interval (UI), or symbol interval, in which data is modulated or encoded in the waveform of a transmitted signal. A DFE may be implemented in the receiver. The DFE is a nonlinear equalizer that can be configured to flatten channel response and limit signal distortion without introducing noise or crosstalk that can occur with equalizers that operate using amplification of received signals.

Figure 4:
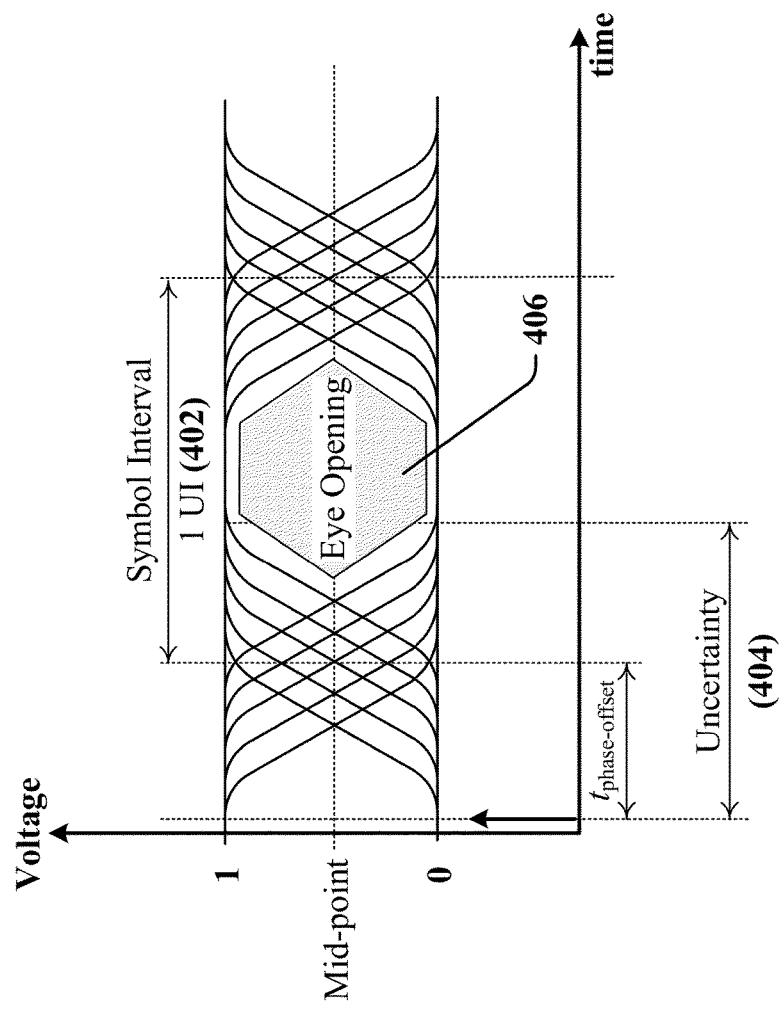
FIG. 4 illustrates an eye diagram.

FIG. 4 illustrates an eye diagram 400 generated as an overlay of multiple symbol intervals, including a single symbol interval 402. A signal transition region 404 represents a time period of uncertainty at the boundary between two symbols where variable signal rise times prevent reliable decoding. State information may be determined reliably in a region defined by an eye opening 406 that represents the time period in which the symbol is stable and can be reliably received and decoded. The eye opening 406 may define a region in which mid-point crossings do not occur and a receiver or decoder can reliably sample, demodulate or decode information from a data signal in the symbol interval 402. The eye opening 406 may be narrowed along the time axis by ISI, reflections, increases in data rate, for example.

The eye opening 406 may be compressed in the voltage axis by ISI and other types of interference and distortion.

The concept of periodic sampling and display of the signal is useful during design, adaptation and configuration of systems which use a clock and data recovery (CDR) circuit that re-creates the received data-timing signal using frequent transitions appearing in the received data. A communication system based on serializer-deserializer (SERDES) technology is an example of a system where an eye opening 406 in an eye diagram 400 can be utilized as a basis for judging the ability to reliably recover data. In some implementations, an eye-opening monitor (EOM) may be implemented using one or more comparators that can indicate when the voltage in a channel is sufficiently higher or lower than the mid-point voltage to enable reliable sampling of the signal carried by the channel. DFEs are commonly used in serial links, including in high-speed LPDDR SDRAM I/O and SERDES circuits. A DFE may be employed to subtract ISI from incoming signal using feedback provided by a finite impulse response (FIR) filter. DFEs can be effective in removing notches in frequency response of the channel associated with reflections or other non-idealities in the channel.

Figure 5:
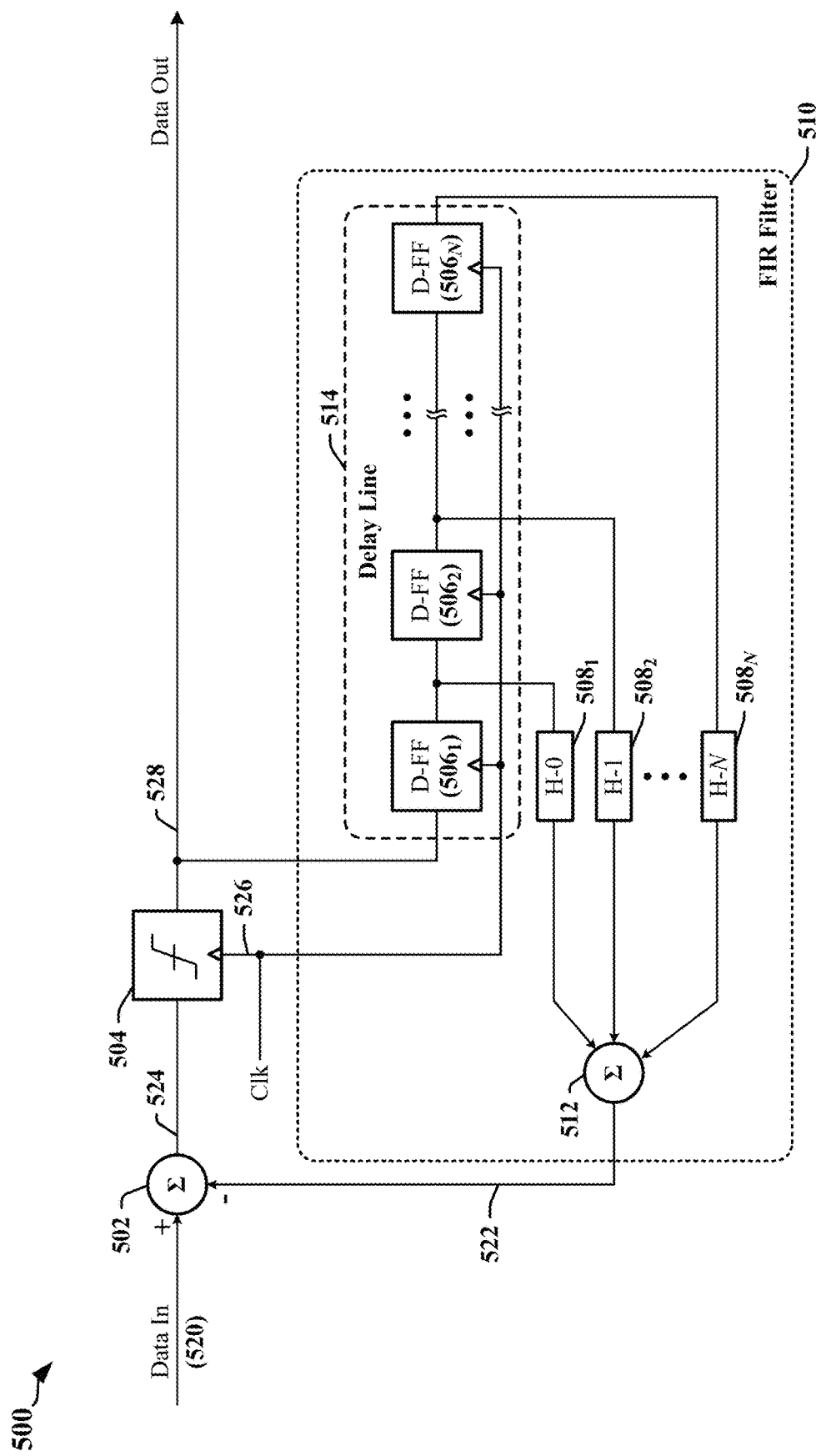
FIG. 5 illustrates an example of a conventional multi-tap decision-feedback equalizer.

FIG. 5 illustrates an example of a conventional multi-tap DFE 500. A current summer or adder 502 may be configured to sum a data input signal 520 and a feedback signal 522 provided by a finite input response (FIR) filter 510. The output 524 of the current summer or adder 502 is provided to a slicer 504, which may be implemented using a flipflop or latch that is clocked by a receive clock signal 526. The receive clock signal 526 may be configured to capture data from a serial bus. The slicer 504 produces a sliced data signal 528 that is provided as an input to the FIR filter 510.

The illustrated FIR filter 510 includes a delay line 514 that can maintain the signaling state of the data input signal 520 in a number of previous transmission intervals. In one example, signaling state may be represented by a binary bit. In other examples, signaling state may be represented by a multibit binary number. In some examples, signaling state of a multibit input signal may be represented by a symbol. The output of the slicer 504 represents the current symbol value or signaling state of the channel in the current transmission interval. The current transmission interval may be referred to as the cursor. Outputs of the delay line 514 maintain representations of symbol value or signaling state of the channel in one or more post-cursor transmission intervals and may be used to cancel reflections and other post-cursor ISI affecting the channel in the current transmission interval. Weighted versions of the outputs of the delay line 514 may be used to subtract post-cursor ISI from the data input signal 520.

In the illustrated example, the sliced data signal 528 is used to drive the delay line 514. The delay line includes a number (N) of D-flipflops (D-FFs $506_1$-$506_N$) clocked by the receive clock signal 526. Weight values can be applied to the outputs of the D-FFs $506_1$-$506_N$. In the illustrated example, configurable weighted tap coefficients $508_0$-$508_N$ are applied to the outputs of the D-FFs $506_1$-$506_N$ in a feedback path that includes a current summer or adder 512 that adds the weighted prior decisions to produce the feedback signal 522.

In the illustrated example, the feedback signal 522 provides negative feedback. Magnitudes and polarities of the weighted tap coefficients $508_0$-$508_N$ can be configured, calibrated or adjusted to compensate for channel characteristics. The multi-tap DFE 500 can be configured to cancel ISI attributable to previous bits received in the data input signal 520, enabling later-received bits to be sampled or detected by the slicer 504 with reduced bit error rate (BER). In some instances, the weighted tap coefficients $508_0$-$508_N$ can be preconfigured by a designer or application. A controller may determine the value of the weights based on preconfigured information or information obtained from calibration or training. In some instances, the configuration, calibration, training or adjustment of the weighted tap coefficients $508_0$-$508_N$ can be performed using an adaptive algorithm. In some implementations, the weighted tap coefficients $508_0$-$508_N$ are applied to control current levels using a current digital-to-analog converter (IDAC) and/or a bias control circuit.

Figure 6:
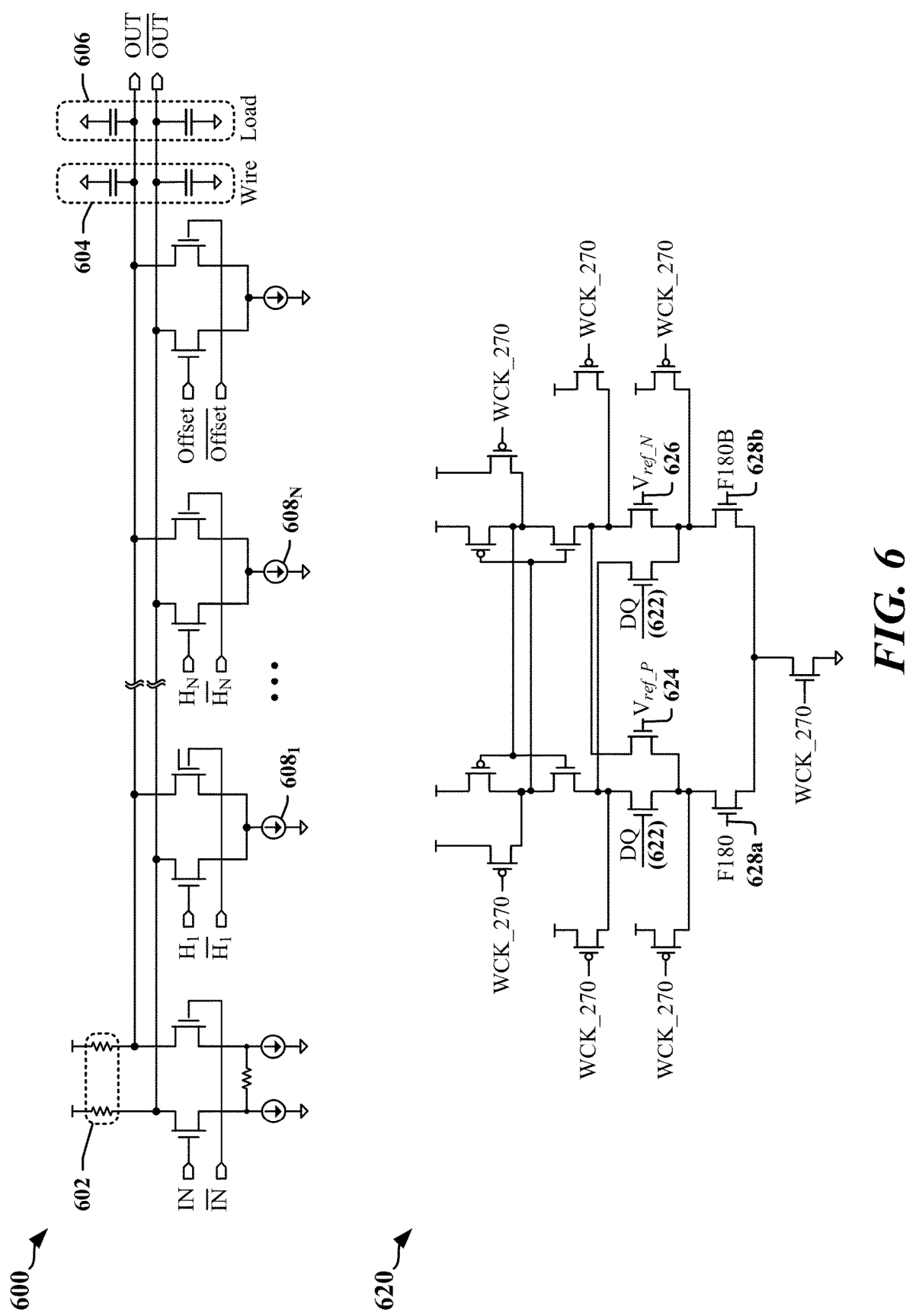
FIG. 6 illustrates an example of a decision-feedback equalizer that includes a resistive-load summer and a direct feedback decision-feedback equalizer.

FIG. 6 illustrates examples of circuits that may be used to implement conventional DFEs. A resistive-load summer 600 uses a load provided by resistances 602 (R) that, combined with wire capacitances 604 and load capacitances 606 (collectively, "C"), can impact the settling time of transitions in data signals due to the resultant RC time constant. The resistive value of the resistances 602 can determine the swing time of the output of the resistive-load summer 600 in a tradeoff between RC and IR values can limit operational frequency of the resistive-load summer 600. The resistive-load summer 600 includes current sources $608_1$-$608_N$ that provide DC bias current for each of the N taps, which can result in increased power consumption that can tax power budgets for the receiver, and which may be problematic for LPDDR SDRAM applications.

In a direct feedback DFE 620, the current bit (cursor) is compared to a first reference voltage 624 ($V_{Ref\_P}$) when the previous bit is in a first logic state ("1") and is compared to a second reference voltage 626 ($V_{Ref\_N}$) when the previous bit is in a second logic state ("0"). The direct feedback DFE 620 requires a stack of 5 transistors, which typically renders the direct feedback DFE 620 unsuitable for low-voltage applications. The direct feedback DFE 620 can also suffer from data-dependency effects when the differential switching signal pair 628a, 628b ("F180" and "F180B") do not switch between full CMOS levels for certain data patterns. The illustrated direct feedback DFE 620 does include offset cancelation circuits and additional circuits may be required for calibration purposes.

Conventional DFEs include complex circuitry and often employ multiple current sources, resulting in high power consumption and large transistor stacks that can prevent low-voltage operation and increase power consumption. Certain DFEs may be unable to meet critical timing path requirements for the DFE feedback loop. At least some of these issues are exacerbated by demands for increased data rates and reduced operating voltages.

A direct-feedback DFE provided in accordance with certain aspects of this disclosure includes a parallel DFE coefficient path that can operate at low voltages with reduced DFE feedback loop delays. In one aspect, the presently disclosed DFE enables independent tuning for pullup and pulldown paths. In some instances, the presently disclosed direct-feedback DFE may be implemented in LPDDR SDRAM I/O circuits.

Certain examples of circuits, including direct-feedback circuits, are illustrated herein as being implemented using P-type metal-oxide-semiconductor (PMOS) transistors, N-type metal-oxide-semiconductor (NMOS) transistors or some combination of NMOS and PMOS transistors. These circuits are provided by way of example only, and it is contemplated that the concepts disclosed herein can be implemented in circuits that use various other combinations of NMOS and PMOS transistors.

Figure 7:
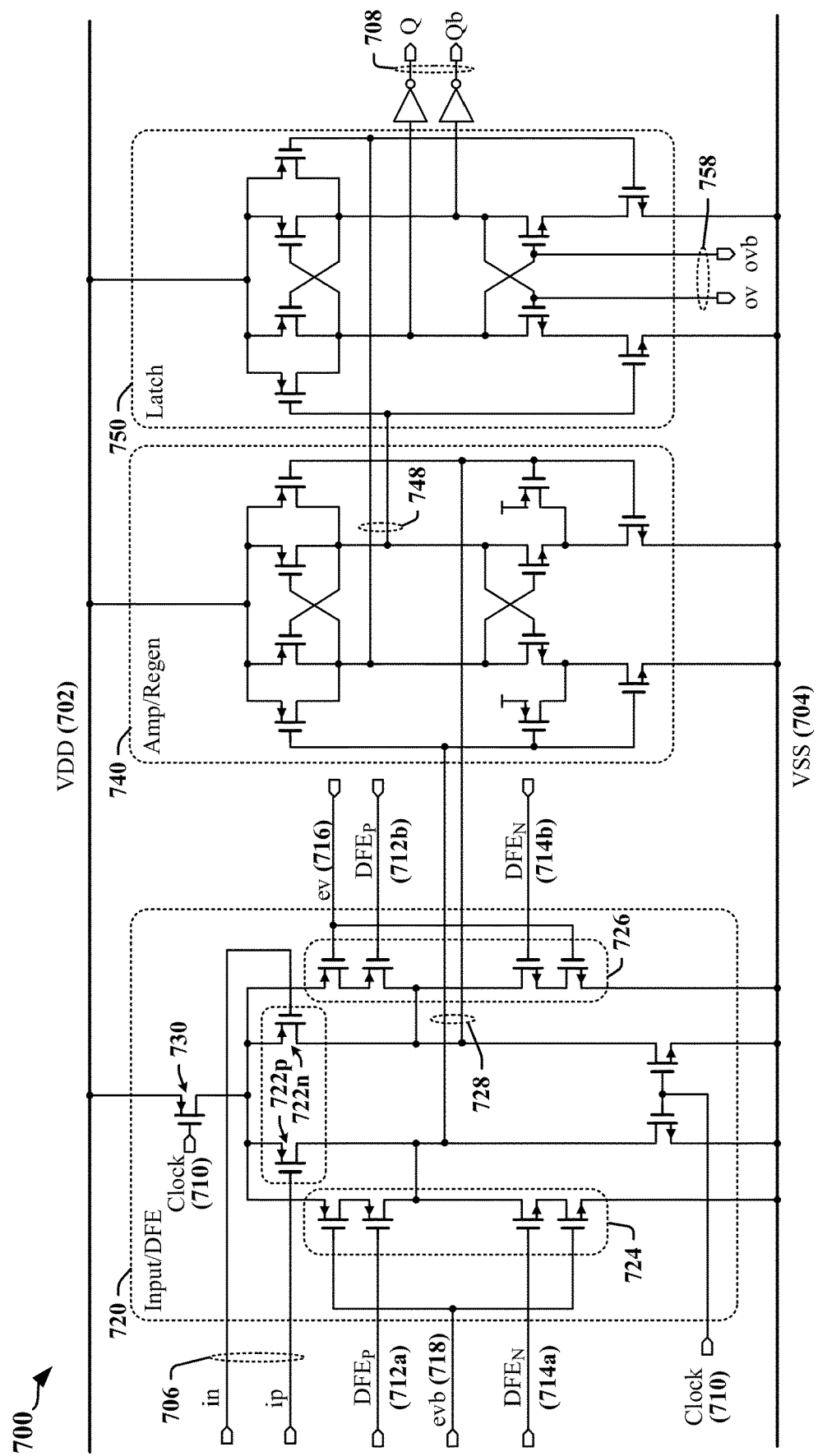
FIG. 7 illustrates an example of a direct-feedback decision-feedback equalizer implemented in accordance with certain aspects of this disclosure.

FIG. 7 illustrates an example of a direct-feedback DFE 700 implemented in accordance with certain aspects of this disclosure. The direct-feedback DFE 700 provides parallel mixing of feedback. Two instances of the direct-feedback DFE 700 may be combined or cooperate to provide a half-rate DFE system. The illustrated direct-feedback DFE 700 is configured to implement an even path of the half-rate DFE system. In some implementations, the direct-feedback DFE 700 may be adapted to operate as a full-rate DFE system, where the adaptation may include the addition of a delay line to store the state of the output 708 or 758 the direct-feedback DFE 700 for one or more transmission intervals. As will be discussed in relation to FIG. 10, the two instances of the direct-feedback DFE 700 that implement the even and odd paths of the half-rate DFE system can have the same internal configuration in even and odd paths, with odd or even modes of operation being defined by phase of a clock signal 710. In the illustrated example, the direct-feedback DFE 700 is implemented with an input stage 720, an amplification/regeneration stage 740 and a latch stage 750.

Figure 8:
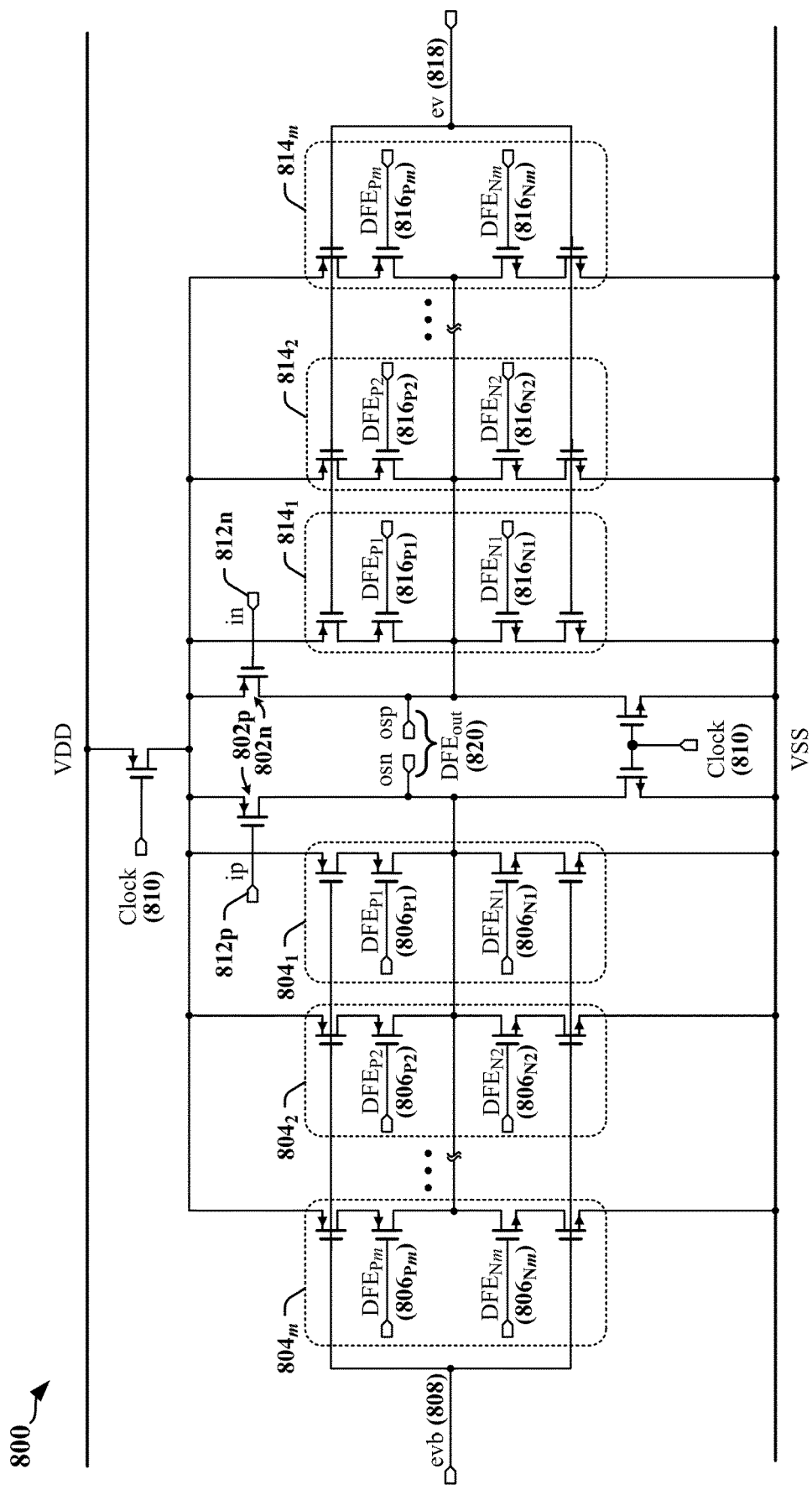
FIG. 8 illustrates a first example of an input stage of a direct-feedback decision-feedback equalizer that has been adapted or configured in accordance with certain aspects of this disclosure.
Figure 9:
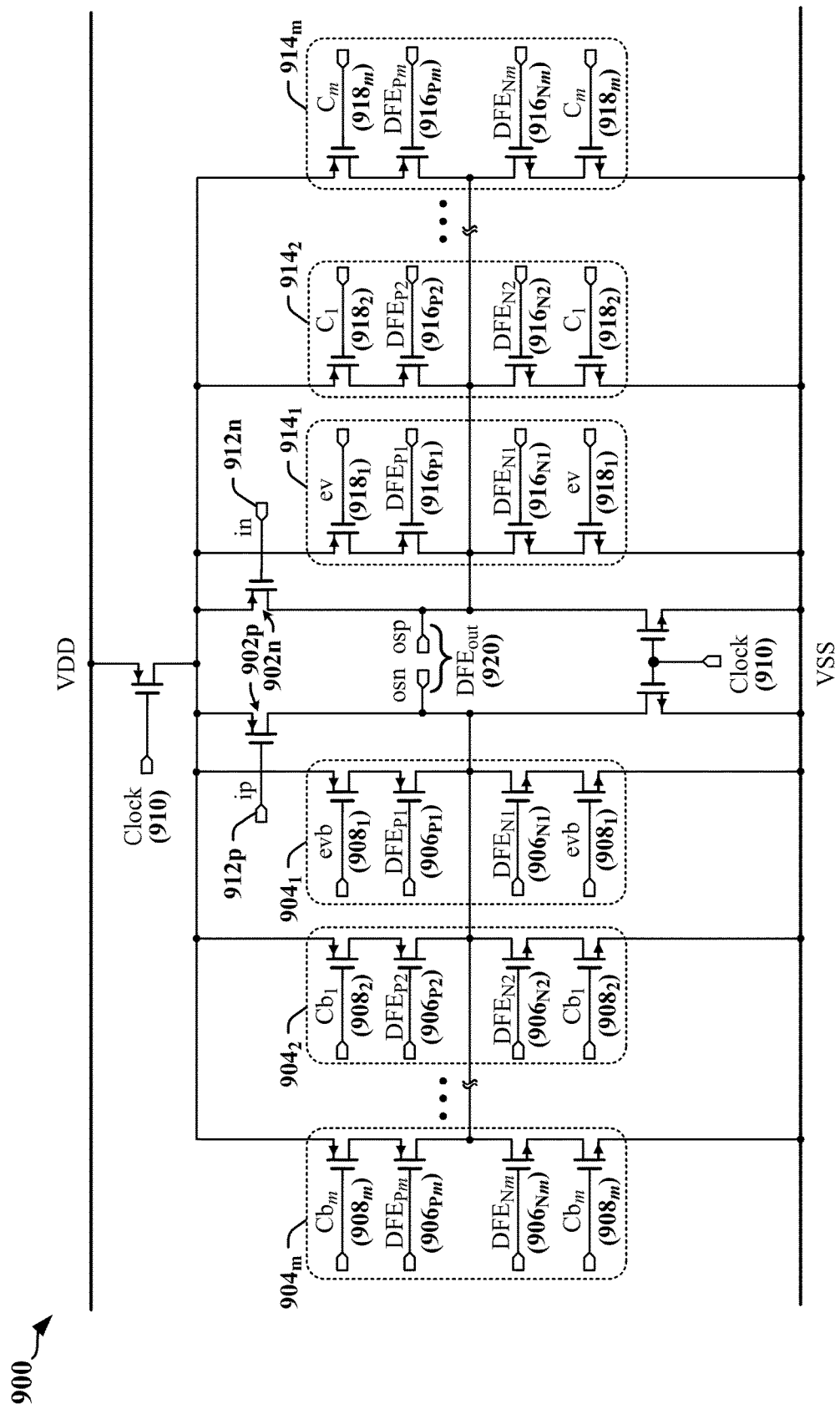
FIG. 9 illustrates a second example of an input stage of a direct-feedback decision-feedback equalizer that has been adapted or configured in accordance with certain aspects of this disclosure.

One example of an input stage 720 is depicted in FIG. 7, with certain aspects illustrated in more detail in FIGS. 8 and 9. The illustrated direct-feedback DFE 700 receives feedback from one preceding odd transmission interval. The terms odd and even transmission intervals are used herein to distinguish between successive bit transmission intervals in a data signal. In one example, a hexadecimal byte 0xAA (0b10101010 in binary notation) can be encoded in eight bit transmission intervals for transmission over a one-wire data channel where four even bit transmission intervals encoding a bit value of '1' are interleaved with four odd bit transmission intervals encoding a bit value of '0'. Each odd transmission interval follows an even transmission interval and each even transmission interval follows an odd transmission interval. Each direct-feedback DFE 700 in a half-rate DFE system processes only the odd data bits or the even data bits and the clock signal 710 can be provided at half the clock frequency of the transmission clock used to control the encoding of data in the data signal.

The input stage 720 of the illustrated direct-feedback DFE 700 receives a differential input signal 706 that may be encoded with data. The differential input signal 706 is provided to an amplifier circuit that has a pair of input transistors 722n, 722p that drives the output of the amplification/regeneration stage 740. The input stage 720 includes a first DFE circuit 724 in which a first PMOS pullup structure is configured to couple a drain of a first input transistor 722p to a higher voltage rail (VDD 702) of a power supply and a first NMOS pulldown structure is configured to couple the drain of the first input transistor 722p to a lower voltage rail (VSS 704) of the power supply. The input stage 720 further includes a second DFE circuit 726 in which a second PMOS pullup structure is configured to couple a drain of a second input transistor 722n to VDD 702 and a second NMOS pulldown structure that is configured to couple the drain of the second input transistor 722n to VSS 704.

The outputs of the DFE circuits 724 and 726 are summed with the outputs of the pair of input transistors 722n, 722p. Summing is effected by charge accumulation and the contribution of each DFE circuit 724 and 726 to the voltage of the equalized data signal 728 output by the input stage 720 is determined by DFE coefficients 712a, 714a and 712b, 714b, and the state of a differential feedback signal (ev 716 and evb 718) received from another direct-feedback DFE (not shown) that is provided in the odd path of the half-rate DFE system.

In the illustrated example, evb 718 is provided to a first DFE circuit 724 and activates either the PMOS pullup structure or the NMOS pulldown structure of the first DFE circuit 724, while ev 716 is provided to a second DFE circuit 726 and activates either the PMOS pullup structure or the NMOS pulldown structure of the second DFE circuit 726. The magnitude of the contribution of the-pullup structures of the DFE circuits 724 and 726 that can be provided to the voltage of the equalized data signal 728 is determined by first DFE coefficients 712a, 712b. The magnitude of the contribution of the pulldown structures of the DFE circuits 724 and 726 that can be provided to the voltage of the equalized data signal 728 is determined by second DFE coefficients 714a, 714b.

The input stage 720 of the illustrated direct-feedback DFE 700 is disabled when the clock signal 710 is in a first signaling state (here a high voltage state provided to transistor 730) and enabled when the clock signal 710 is in a second signaling state (here a low voltage state). The output of the direct-feedback DFE 700 is controlled by the input stage 720 when the clock signal 710 is in the second signaling state and the input stage 720 is enabled and active. The output of the direct-feedback DFE 700 is maintained by the latch stage 750 when the clock signal 710 is in the first signaling state and the input stage 720 is disabled and inactive.

The amplification/regeneration stage 740 may be configured to amplify or otherwise conform the equalized data signal 728 to specifications for complementary metal-oxide-semiconductor (CMOS) digital circuits. In some instances, the amplification/regeneration stage 740 can increase the amplitude of the equalized data signal 728 to ensure that its output switches between CMOS voltage levels. In some instances, the amplification/regeneration stage 740 can provide a slew rate for transitions in an output signal 748 that meets specifications for certain CMOS digital circuits.

In the illustrated example, the latch stage 750 is configured as a set-reset latch (SR latch) that provides a latched output 758 that is a stable representation of the output signal 748 provided by the amplification/regeneration stage 740. The latched output 758 is set or reset based on signaling state of the inputs of the latch stage 750. The latch stage 750 can be used to store and maintain state information when the input stage 720 is disabled and inactive. The latched output 758 may be buffered to provide the output 708 of the direct-feedback DFE 700. In the illustrated example, the direct-feedback DFE 700 is configured to implement an even path of a half-rate DFE system and the latched output 758 may be provided as a feedback signal to another direct-feedback DFE (not shown) that is provided in the odd path of the half-rate DFE system.

In some implementations, the DFE coefficients 712a, 714a and 712b, 714b include analog signals with configurable amplitudes or binary weighted coefficients. In one example, analog signals that encode the DFE coefficients 712a, 714a and 712b, 714b can be generated externally (with respect to the circuitry of the direct-feedback DFE 700) using a digital-to-analog converter (DAC). In some implementations, a controller may determine one or more codewords that define the weights to be applied to the differential feedback signal (ev 716 and evb 718), where the codewords are used to configure one or more DACs that generate the analog signals representing the DFE coefficients 712a, 714a and 712b, 714b.

In some implementations, the DFE coefficients 712a, 714a and 712b, 714b include multibit digital signals that represent binary codewords used to configure the DFE circuits 724 and 726. In some examples, on-bit digital signals may be used to define the weights to be applied to the differential feedback signal (ev 716 and evb 718).

FIG. 8 illustrates an input stage 800 of a direct-feedback DFE that has been adapted or configured in accordance with certain aspects of this disclosure. The input stage 800 may correspond in many respects to the input stage 720 of the direct-feedback DFE 700 illustrated in FIG. 7. For example, the illustrated input stage 800 may be provided in a direct-feedback DFE that is configured to implement an even path of a half-rate DFE system. The illustrated input stage 800 includes multiple DFE circuits $804_1$-$804_m$ and $814_1$-$814_m$.

The illustrated input stage 800 receives feedback signals (evb 808 and ev 818) from a preceding odd transmission interval, and a differential input signal (ip 812p and in 812n) that may be encoded with data. The differential input signal is provided to an amplifier circuit that has a pair of input transistors 802p and 802n that drives a differential equalized output 820 of the input stage 800. The outputs of a first set of the DFE circuits $804_1$-$804_m$ are coupled to the drain of a first input transistor 802p and the outputs of a second set of the DFE circuits $814_1$-$814_m$ are coupled to the drain of a second input transistor 802n. The differential voltage of the equalized output 820 is determined by charge accumulation attributable in part to the contribution of each of the DFE circuits $804_1$-$804_m$ and $814_1$-$814_m$. The state of evb 808 and ev 818 determines whether pullup or pulldown structures of the DFE circuits $804_1$-$804_m$ and $814_1$-$814_m$ are to be activated.

In the illustrated example, evb 808 is provided to the first set of the DFE circuits $804_1$-$804_m$, and activates either the PMOS pullup structures or the NMOS pulldown structures in the first set of the DFE circuits $804_1$-$804_m$. The magnitude of the contribution of the pullup structures in the first set of the DFE circuits $804_1$-$804_m$ to the voltage of the equalized output 820 is determined by first binary weighted DFE coefficients $806_{P1}$-$806_{Pm}$. The magnitude of the contribution of the pulldown structures in the first set of the DFE circuits $804_1$-$804_m$, to the voltage of the equalized output 820 is determined by second binary weighted DFE coefficients $806_{N1}$-$806_{Nm}$.

In the illustrated example, ev 818 is provided to the second set of the DFE circuits $814_1$-$814_m$, and activates either the PMOS pullup structure or the NMOS pulldown structures in the second set of the DFE circuits $814_1$-$814_m$. The magnitude of the contribution of the pullup structures in the second set of the DFE circuits $814_1$-$814_m$, to the voltage of the equalized output 820 is determined by third binary weighted DFE coefficients $816_{P1}$-$816_{Pm}$. The magnitude of the contribution of the pulldown structures in the second set of the DFE circuits $814_1$-$814_m$ to the voltage of the equalized output 820 is determined by second binary weighted DFE coefficients $816_{N1}$-$816_{Nm}$.

In the illustrated example, each of the binary weighted DFE coefficients $806_{P1}$-$806_{Pm}$, $806_{N1}$-$806_{Nm}$, $816_{P1}$-$816_{Pm}$, $816_{N1}$-$816_{Nm}$ represents a binary m-bit codeword. In one example, the least significant bit of each codeword represents a minimum weight value ($W_{min}$) when set to '1' and the most significant bit represents a weight value of $W_{min} \times 2^{m-1}$ when set to '1'. The transistors in the pullup and pulldown structures may be configured to provide a voltage or current contribution to the equalized output 820 commensurate with the value encoded by corresponding binary weighted DFE coefficients $806_{P1}$-$806_{Pm}$, $806_{N1}$-$806_{Nm}$, $816_{P1}$-$816_{Pm}$, $816_{N1}$-$816_{Nm}$.

The operation of the illustrated input stage 800 is controlled by a clock signal 810. The input stage 800 is disabled when the clock signal 810 is in a first signaling state (here a high voltage state) and enabled when the clock signal 810 is in a second signaling state (here a low voltage state).

A direct-feedback DFE configured or adapted in accordance with certain aspects of this disclosure may receive feedback based on multiple previously received bits. The examples illustrated in FIGS. 7 and 8 relate to a half-rate DFE system in which the direct-feedback DFE in the even path may be configured to process an even bit in a data signal using feedback related to the immediately preceding odd bit, and in which the direct-feedback DFE in the odd path may be configured to process an odd bit in the data signal using feedback related to the immediately preceding even bit. The outputs of the direct-feedback DFEs may be provided to one or more shift registers that are clocked using a signal based on, or derived from the clock signals provided to the input stages of the direct-feedback DFEs. In some implementations, the bits in the shift registers may be used to provide additional weighted feedback to the direct-feedback DFEs.

FIG. 9 illustrates an input stage 900 of a direct-feedback DFE that has been adapted or configured in accordance with certain aspects of this disclosure to use feedback generated based on multiple previously received bits. The input stage 900 may correspond in many respects to the input stage 720 of the direct-feedback DFE 700 illustrated in FIG. 7. For example, the illustrated input stage 900 may be provided in a direct-feedback DFE that is configured to implement an even path of a half-rate DFE system. The illustrated input stage 900 includes multiple DFE circuits $904_1$-$904_m$ and $914_1$-$914_m$.

The illustrated input stage 900 receives a differential input signal (ip 912p and in 912n) that may be encoded with data, and a feedback signal (evb $908_1$ and ev $918_1$) from a preceding odd transmission interval. The input stage 900 may receive additional feedback signals ($Cb_1$ $908_2$-$Cb_m$ $908_m$ and $C_1$ $918_2$-$C_m$ $918_m$) that may be representative of a sequence of one or more previously received bits. The differential input signal is provided to an amplifier circuit that has a pair of input transistors 902p and 902n that drives a differential equalized output 920 of the input stage 900. The outputs of a first set of the DFE circuits $904_1$-$904_m$ are coupled to the drain of a first input transistor 902p and the outputs of a second set of the DFE circuits $914_1$-$914_m$ are coupled to the drain of a second input transistor 902n. The differential voltage of the equalized output 920 is determined by charge accumulation attributable in part to the contribution of each of the DFE circuits $904_1$-$904_m$ and $914_1$-$914_m$. The state of the feedback signals determines whether pullup or pulldown structures of the DFE circuits $904_1$-$904_m$ and $914_1$-$914_m$ are to be activated.

In the illustrated example, evb $908_1$ is provided to a first DFE circuit $904_1$ and activates either the PMOS pullup structure or the NMOS pulldown structure of the first DFE circuit $904_1$. The magnitude of the contribution of the pullup structures of the first DFE circuit $904_1$ to the voltage of the equalized output 920 is determined by first binary weighted DFE coefficients $906_{P1}$. The magnitude of the contribution of the pulldown structures of the first DFE circuit $904_1$ to the voltage of the equalized output 920 is determined by second binary weighted DFE coefficients $906_{N1}$.

In the illustrated example, ev $918_1$ is provided to a second DFE circuit $914_1$ and activates either the PMOS pullup structure or the NMOS pulldown structure of the second DFE circuit $914_1$. The magnitude of the contribution of the pullup structures of the second DFE circuit $914_1$ to the voltage of the equalized output 920 is determined by first binary weighted DFE coefficients $916_{P1}$. The magnitude of the contribution of the pulldown structures of the second DFE circuit $914_1$ to the voltage of the equalized output 920 is determined by second binary weighted DFE coefficients $916_{N1}$.

Each of the additional feedback signals $908_2$-$908_m$ and $918_2$-$918_m$, are provided to one of the additional DFE circuits $904_2$-$904_m$ or $914_2$-$914_m$ and activates either the PMOS pullup structure or the NMOS pulldown structures of the additional DFE circuits $904_2$-$904_m$, $9142$-$914_m$. The magnitude of the contribution of the pullup and pulldown structures of the additional DFE circuits $904_2$-$904_m$, $9142$-$914_m$ to the voltage of the equalized output 920 is determined by corresponding DFE coefficients $906_{P2}$-$906_{Pm}$, $906_{N2}$-$906_{Nm}$, $916_{P2}$-$916_{Pm}$ or $916_{N2}$-$916_{Nm}$.

The DFE coefficients $906_{P1}$-$906_{Pm}$, $906_{N1}$-$906_{Nm}$, $916_{P1}$-$916_{Pm}$ and $916_{N1}$-$916_{Nm}$ may include analog signals with configurable amplitudes or binary weighted coefficients. In some implementations, analog signals that encode the DFE coefficients $906_{P1}$-$906_{Pm}$, $906_{N1}$-$906_{Nm}$, $916_{P1}$-$916_{Pm}$ and $916_{N1}$-$916_{Nm}$ can be generated using a DAC. In one example, a controller may determine codewords that define the weights to be applied to the feedback signals, where the codewords can be used to configure one or more DACs that generate the analog signals representing the DFE coefficients $906_{P1}$-$906_{Pm}$, $906_{N1}$-$906_{Nm}$, $916_{P1}$-$916_{Pm}$ and $916_{N1}$-$916_{Nm}$.

In some implementations, the DFE coefficients $906_{P1}$-$906_{Pm}$, $906_{N1}$-$906_{Nm}$, $916_{P1}$-$916_{Pm}$ and $916_{N1}$-$916_{Nm}$ include multibit digital signals that represent binary codewords used to configure the DFE circuits $904_1$-$904_m$ and $914_1$-$914m$. In some examples, the multibit digital signals may be used to control multiple DFE circuits for each feedback signal (see FIG. 8, for example).

The operation of the illustrated input stage 900 is controlled by a clock signal 910. The input stage 900 is disabled when the clock signal 910 is in a first signaling state (here a high voltage state) and enabled when the clock signal 910 is in a second signaling state (here a low voltage state).

Figure 10:
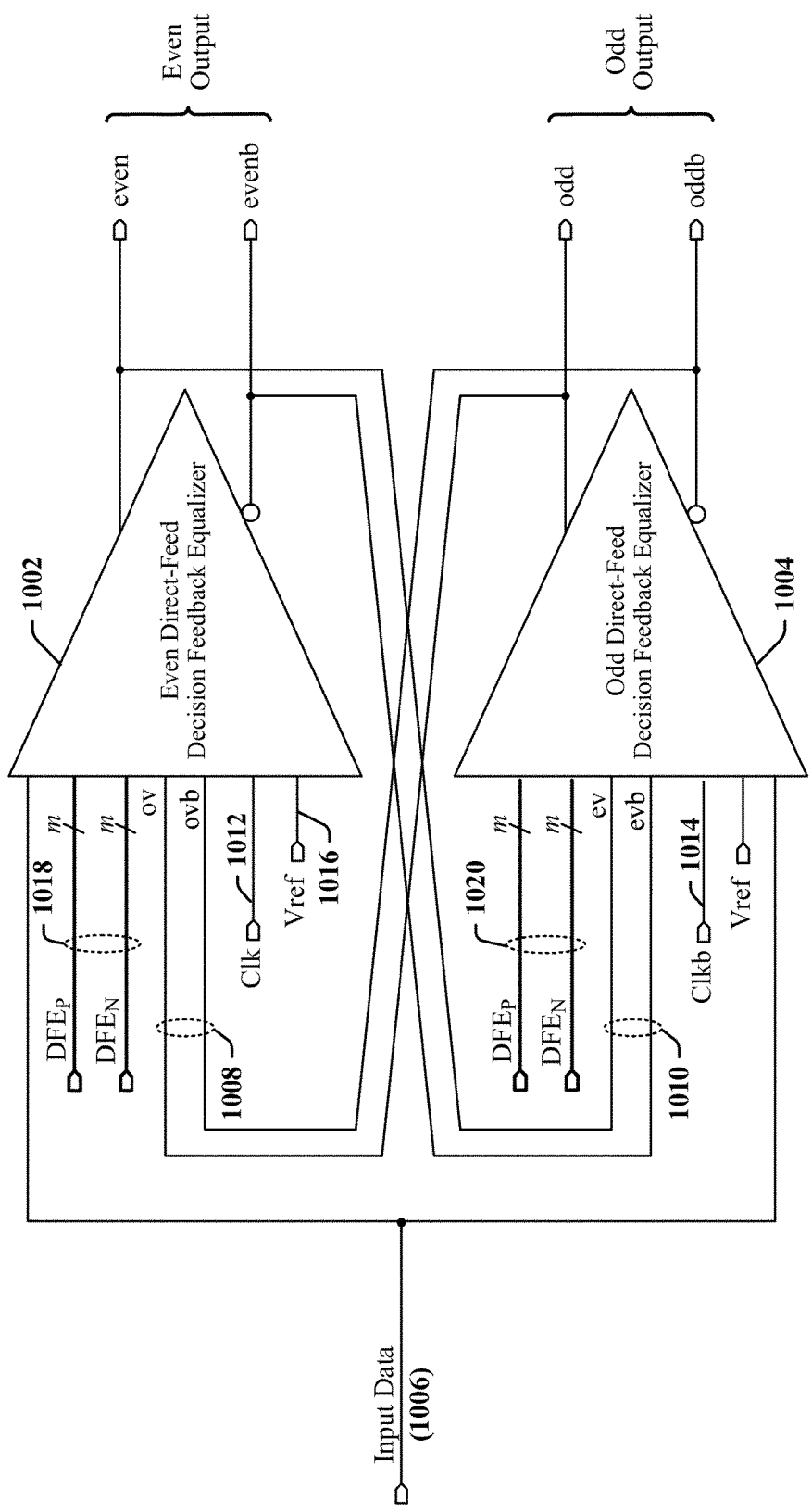
FIG. 10 illustrates an example of a half-rate decision-feedback equalizer system that may be configured or adapted in accordance with certain aspects of this disclosure.

FIG. 10 illustrates an example of a half-rate DFE system 1000 that may be configured or adapted in accordance with certain aspects of this disclosure. The half-rate DFE system 1000 includes a first direct-feedback DFE in the even path (the even path DFE 1002) that can be configured to process an even bit in a data signal 1006 using feedback 1008 related to the immediately preceding odd bit. The half-rate DFE system 1000 includes a second direct-feedback DFE in the odd path (the odd path DFE 1004) that can be configured to process an odd bit in the data signal 1006 using feedback 1010 related to the immediately preceding even bit. The feedback 1008 used by the even path DFE 1002 is output by the odd path DFE 1004, and the feedback 1010 used by the odd path DFE 1004 is output by the even path DFE 1002. In some implementations, the data signal 1006 provided to the even path DFE 1002 and odd path DFE 1004 is a single ended signal. In some implementations, the data signal 1006 provided to the even path DFE 1002 and odd path DFE 1004 is a differential signal.

The even path DFE 1002 and the odd path DFE 1004 may correspond in various respects to the direct-feedback DFE 700 illustrated in FIG. 7 and may include input stages that correspond to the input stage 800 illustrated in FIG. 8 or the input stage 900 illustrated in FIG. 9. In some implementations, the even path DFE 1002 and the odd path DFE 1004 may include input stages that combine certain features of the input stage 800 illustrated in FIG. 8 with other features of the input stage 900 illustrated in FIG. 9.

The even path DFE 1002 and the odd path DFE 1004 may be clocked by clock signals 1012 and 1014 that are different phase versions of a transmission clock signal that provides timing information related to transmission intervals in the data signal 1006. In the illustrated example, the clock signals 1012, 1014 are complementary, such that the clock signal 1014 provided to the odd path DFE 1004 is phase-shifted by a nominal 180° phase shift with respect to the clock signal 1012 provided to the even path DFE 1002.

DFE coefficients 1018 and 1020 are provided to the even path DFE 1002 and the odd path DFE 1004, respectively. In the illustrated half-rate DFE system 1000 a reference voltage 1016 may be used to calibrate certain circuits in the even path DFE 1002 and the odd path DFE 1004. In one example, the operating points of one or more transistors in the input stages of the even path DFE 1002 and the odd path DFE 1004 may be calibrated during system initialization and/or during a training procedure. The calibration or training procedure may be used to reduce or eliminate weighting mismatches in DFE circuits included in the even path DFE 1002 and/or the odd path DFE 1004.

A DFE system configured in accordance with certain aspects of this disclosure can remove or limit post-cursor ISI. The presently disclosed direct-feedback DFEs can operate without DC Bias current sources. A direct-feedback DFE can be implemented with a limited number of concurrently active stacked transistors. For example, only 2 transistors are active in each of the DFE circuits 724 and 726 in FIG. 7 for each signaling state of the clock signal 710. A maximum of three transistors are turned on between power supply rails 702, 704 at any time and sufficient voltage headroom can be provided to enable the presently disclosed direct-feedback DFE to support low-voltage operation. The voltage headroom in the illustrated DFE circuits 724 and 726 may represent the difference between the voltage amplitude of the power supply rails 702, 704 and the sum of minimum voltage drops across the constituent transistors and rated maximum voltage swing of the equalized data signal 728.

DFE coefficients provided in accordance with certain aspects of this disclosure are implemented differentially. The use of differential data signals and weighted differential feedback signals can permit the associated push-pull circuits in a direct-feedback DFE 700 to be constructed from reduced-size transistors. Reducing transistor size can result in circuits and/or devices that are smaller than would be required for non-differential DFE circuits. Smaller device sizes can minimize series loading on internal nodes and can enable faster operation of the DFE circuits.

Referring again to FIG. 7, DFE coefficients 712a, 714a, 712b, 714b provided to the DFE circuits 724 and 726 can be tuned independently in accordance with certain aspects of this disclosure. In certain implementations, the DFE coefficients 712a, 714a, 712b, 714b may be generated during calibration or training of the direct-feedback DFE 700. Mismatches and offsets in process technology, voltage or voltage headroom may affect pullup and/or pulldown strengths. The DFE coefficients 712a, 714a, 712b, 714b may be calibrated to compensate for mismatches and/or offsets and other variabilities affecting the pullup and/or pulldown strengths in the DFE circuits 724 and 726.

In certain implementations, the DFE coefficients 712a, 712b used to configure the PMOS pullup structures of the DFE circuits 724, 726 may be versions of the same signals, and the DFE coefficients 714a, 714b used to configure the NMOS pulldown strength of the DFE circuits 724, 726 may be versions of the same signals. In these implementations, the DFE coefficients 712a. 712b may be generated independently of the DFE coefficients 714a, 714b.

Figure 11:
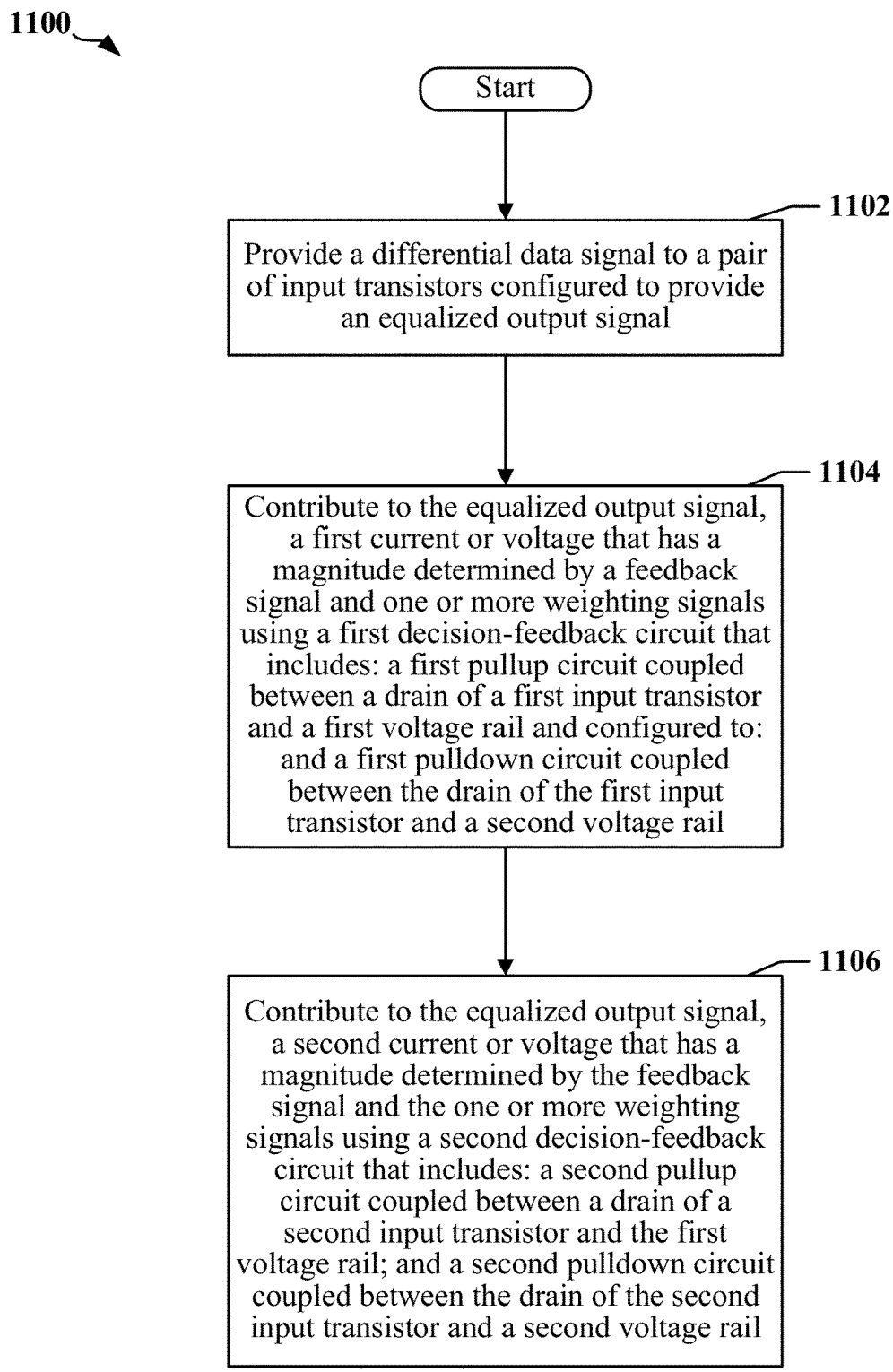
FIG. 11 is a flow diagram illustrating an example of a method for equalizing a data signal in accordance with certain aspects of the present disclosure.

FIG. 11 is a flow diagram illustrating an example of a method 1100 for equalizing a data signal in accordance with certain aspects of the present disclosure. The data signal may be received at a receiver coupled to a communication channel. In one example, the data signal is a differential data signal and the receiver may include one or more of the equalizers illustrated in FIGS. 7-10.

At block 1102, the differential data signal may be provided to a pair of input transistors configured to provide an equalized output signal. At block 1104, a first current or voltage may be contributed to the equalized output signal using a first decision-feedback circuit. The first current or voltage may have a magnitude that is determined by a feedback signal and one or more weighting signals. The first decision-feedback circuit may include a first pullup circuit coupled between a drain of a first input transistor and a first voltage rail, and a first pulldown circuit coupled between the drain of the first input transistor and a second voltage rail. At block 1106, a second current or voltage may be contributed to the equalized output signal using a second decision-feedback circuit. The second current or voltage may have a magnitude that is determined by the feedback signal and the one or more weighting signals. The second decision-feedback circuit may include a second pullup circuit coupled between a drain of a second input transistor and the first voltage rail, and a second pulldown circuit coupled between the drain of the second input transistor and a second voltage rail.

In certain examples, the first pullup circuit and the second pulldown circuit are enabled when the feedback signal is in a first signaling state. The first pulldown circuit and the second pullup circuit may be enabled when the feedback signal is in a second signaling state.

In certain examples, the first weighting signal, the second weighting signal, the third weighting signal and the fourth weighting signal may be calibrated during a system initialization or training procedure. In one example, the first weighting signal, the second weighting signal, the third weighting signal or the fourth weighting signal is an analog signal. In one example, the first weighting signal, the second weighting signal, the third weighting signal or the fourth weighting signal is a multibit digital signal. In some implementations, the first weighting signal is a version of the third weighting signal and the second weighting signal is a version of the fourth weighting signal.

In some instances, additional currents or voltages may be contributed to the equalized output signal through one or more additional decision-feedback circuits. The additional currents or voltages may have magnitudes that are determined by the feedback signal and the one or more weighting signals. The additional decision-feedback circuits are connected in parallel with the first decision-feedback circuit. Each additional decision-feedback circuit may include an additional pullup circuit coupled between the drain of the first input transistor and the first voltage rail and an additional pulldown circuit coupled between the drain of the first input transistor and the second voltage rail. The additional pullup circuit may be configured to contribute, to the equalized output signal, a first additional current or voltage that has a magnitude determined by the feedback signal and a first additional weighting signal. The additional pulldown circuit may be configured to contribute, to the equalized output signal, a second additional current or voltage that has a magnitude determined by the feedback signal and a second additional weighting signal.

In certain examples, signaling state of the equalized output signal is captured during a first transmission interval and used to provide a first decoded data bit. The feedback signal may represent a second decoded data bit captured during a second transmission interval that preceded the first transmission interval.

A decision-feedback equalizer implemented, adapted or configured in accordance with certain aspects of this disclosure has a pair of input transistors, a first decision-feedback circuit and a second decision-feedback circuit. The pair of input transistors may be configured to receive a differential data signal and configured to provide an output signal.

The first decision-feedback circuit may include a first pullup circuit and a first pulldown circuit. The first pullup circuit may be coupled between a drain of a first input transistor and a first voltage rail. The first pullup circuit may be configured to contribute, to the output signal, a first current or voltage that has a magnitude determined by a feedback signal and a first weighting signal. The first pulldown circuit may be coupled between the drain of the first input transistor and a second voltage rail. The first pulldown circuit may be configured to contribute, to the output signal, a second current or voltage that has a magnitude determined by the feedback signal and a second weighting signal.

The second decision-feedback circuit may include a second pullup circuit and a second pulldown circuit. The second pullup circuit may be coupled between a drain of a second input transistor and the first voltage rail. The second pullup circuit may be configured to contribute, to the output signal, a third current or voltage that has a magnitude determined by the feedback signal and a third weighting signal. The second pulldown circuit may be coupled between the drain of the second input transistor and a second voltage rail. The second pulldown circuit may be configured to contribute, to the output signal, a fourth current or voltage that has a magnitude determined by the feedback signal and a fourth weighting signal.

In some implementations, the first pullup circuit and the second pulldown circuit are enabled when the feedback signal is in a first signaling state. The first pulldown circuit and the second pullup circuit are enabled when the feedback signal is in a second signaling state. In some example, the first weighting signal is a version of the third weighting signal and the second weighting signal is a version of the fourth weighting signal.

In some implementations, the first weighting signal, the second weighting signal, the third weighting signal and the fourth weighting signal are calibrated during a system initialization or training procedure. The first weighting signal, the second weighting signal, the third weighting signal or the fourth weighting signal may be an analog signal. The first weighting signal, the second weighting signal, the third weighting signal or the fourth weighting signal may be a multibit digital signal.

In some implementations, one or more additional decision-feedback circuits are connected in parallel with the first decision-feedback circuit. Each additional decision-feedback circuit may have an additional pullup circuit and an additional pulldown circuit. The additional pullup circuit may be coupled between the drain of the first input transistor and the first voltage rail. The additional pullup circuit may be configured to contribute, to the output signal, an additional current or voltage that has a magnitude determined by the feedback signal and a first additional weighting signal.

The additional pulldown circuit may be coupled between the drain of the first input transistor and the second voltage rail. The additional pulldown circuit may be configured to contribute, to the output signal, an additional current or voltage that has a magnitude determined by the feedback signal and a second additional weighting signal.

In certain implementations, the decision-feedback equalizer includes a latch circuit configured to output a first decoded data bit by capturing signaling state of the output signal during a first transmission interval. The feedback signal may represent a second decoded data bit captured during a second transmission interval that preceded the first transmission interval.

In certain implementations, the decision-feedback equalizer is one of two decision-feedback equalizers included in a decision-feedback system. In the decision-feedback system, a first decision-feedback equalizer is configured to capture odd data bits from the differential data signal, and a second decision-feedback equalizer is configured to capture even data bits from the differential data signal. Each captured odd data bit may be provided to the second decision-feedback equalizer as feedback and each captured even data bit may be provided to the first decision-feedback equalizer as feedback.

The operational steps described in any of the exemplary aspects herein are described to provide a subset of examples of possible implementations. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

Some implementation examples are described in the following numbered clauses:

1. A decision-feedback equalizer, comprising: a pair of input transistors configured to receive a differential data signal and configured to provide an output signal; a first decision-feedback circuit that includes: a first pullup circuit coupled between a drain of a first input transistor and a first voltage rail and configured to contribute, to the output signal, a first current or voltage that has a magnitude determined by a feedback signal and a first weighting signal; and a first pulldown circuit coupled between the drain of the first input transistor and a second voltage rail and configured to contribute, to the output signal, a second current or voltage that has a magnitude determined by the feedback signal and a second weighting signal; and a second decision-feedback circuit that includes: a second pullup circuit coupled between a drain of a second input transistor and the first voltage rail and configured to contribute, to the output signal, a third current or voltage that has a magnitude determined by the feedback signal and a third weighting signal; and a second pulldown circuit coupled between the drain of the second input transistor and a second voltage rail and configured to contribute, to the output signal, a fourth current or voltage that has a magnitude determined by the feedback signal and a fourth weighting signal.
2. The decision-feedback equalizer as described in clause 1, wherein the first pullup circuit and the second pulldown circuit are enabled when the feedback signal is in a first signaling state, and wherein the first pulldown circuit and the second pullup circuit are enabled when the feedback signal is in a second signaling state.
3. The decision-feedback equalizer as described in clause 1 or clause 2, wherein the first weighting signal is a version of the third weighting signal and the second weighting signal is a version of the fourth weighting signal.
4. The decision-feedback equalizer as described in any of clauses 1-3, wherein the first weighting signal, the second weighting signal, the third weighting signal and the fourth weighting signal are calibrated during a system initialization or training procedure.
5. The decision-feedback equalizer as described in any of clauses 1-4, wherein the first weighting signal, the second weighting signal, the third weighting signal or the fourth weighting signal is an analog signal.
6. The decision-feedback equalizer as described in any of clauses 1-5, wherein the first weighting signal, the second weighting signal, the third weighting signal or the fourth weighting signal is a multibit digital signal.
7. The decision-feedback equalizer as described in any of clauses 1-6, further comprising: one or more additional decision-feedback circuits connected in parallel with the first decision-feedback circuit, each additional decision-feedback circuit having: an additional pullup circuit coupled between the drain of the first input transistor and the first voltage rail and configured to contribute, to the output signal, an additional current or voltage that has a magnitude determined by the feedback signal and a first additional weighting signal; and an additional pulldown circuit coupled between the drain of the first input transistor and the second voltage rail and configured to contribute, to the output signal, an additional current or voltage that has a magnitude determined by the feedback signal and a second additional weighting signal.
8. The decision-feedback equalizer as described in any of clauses 1-7, further comprising: a latch circuit configured to output a first decoded data bit by capturing signaling state of the output signal during a first transmission interval.
9. The decision-feedback equalizer as described in clause 8, wherein the feedback signal represents a second decoded data bit captured during a second transmission interval that preceded the first transmission interval.
10. A decision-feedback system, comprising: a first decision-feedback equalizer configured to receive a data signal and to provide a first output signal representative of a first data bit captured from the data signal; and a second decision-feedback equalizer configured to receive the data signal and to provide a second output signal representative of a second data bit captured from the data signal using weighted feedback received from the first decision-feedback equalizer, wherein the first decision-feedback equalizer comprises: a pair of input transistors configured to receive the data signal and to drive the first output signal; a first decision-feedback circuit that includes: a first pullup circuit coupled between a drain of a first input transistor and a first voltage rail and configured to contribute, to the first output signal, a first current or voltage that has a magnitude determined by a first feedback signal and a first weighting signal; and a first pulldown circuit coupled between the drain of the first input transistor and a second voltage rail and configured to contribute, to the output signal, a second current or voltage that has a magnitude determined by the first feedback signal and a second weighting signal; and a second decision-feedback circuit that includes: a second pullup circuit coupled between a drain of a second input transistor and the first voltage rail and configured to contribute, to the second output signal, a third current or voltage that has a magnitude determined by a second feedback signal and a third weighting signal; and a second pulldown circuit coupled between the drain of the second input transistor and a second voltage rail and configured to contribute, to the second output signal, a fourth current or voltage that has a magnitude determined by the second feedback signal and a fourth weighting signal.

11. The decision-feedback system as described in clause 10, wherein the first pullup circuit and the second pulldown circuit are enabled when the first feedback signal is in a first signaling state, and wherein the first pulldown circuit and the second pullup circuit are enabled when the first feedback signal is in a second signaling state.

12. The decision-feedback system as described in clause 10 or clause 11, wherein the first weighting signal is a version of the third weighting signal and the second weighting signal is a version of the fourth weighting signal.

13. The decision-feedback system as described in any of clauses 10-12, wherein the first weighting signal, the second weighting signal, the third weighting signal and the fourth weighting signal are calibrated during a system initialization or training procedure.

14. The decision-feedback system as described in any of clauses 10-13, wherein the first weighting signal, the second weighting signal, the third weighting signal or the fourth weighting signal is an analog signal.

15. The decision-feedback system as described in any of clauses 10-14, wherein the first weighting signal, the second weighting signal, the third weighting signal or the fourth weighting signal is a multibit digital signal.

16. The decision-feedback system as described in any of clauses 10-15, further comprising: one or more additional decision-feedback circuits connected in parallel with the first decision-feedback circuit, each additional decision-feedback circuit having: an additional pullup circuit coupled between the drain of the first input transistor and the first voltage rail and configured to contribute, to the first output signal, an additional current or voltage that has a magnitude determined by the first feedback signal and a fifth weighting signal; and an additional pulldown circuit coupled between the drain of the first input transistor and the second voltage rail and configured to contribute, to the first output signal, an additional current or voltage that has a magnitude determined by the first feedback signal and a sixth weighting signal.

17. The decision-feedback system as described in any of clauses 10-16, further comprising: a latch circuit configured to capture the first output signal during a first transmission interval, wherein the latch circuit provides the second feedback signal.

18. The decision-feedback system as described in any of clauses 10-17, wherein the first decision-feedback equalizer receives a differential signal representative of the second output signal, wherein the differential signal comprises complementary signals that are provided to the first decision-feedback circuit and the second decision-feedback circuit as the first feedback signal and the second feedback signal, respectively.

19. A method for equalizing a data signal, comprising: providing a differential data signal to a pair of input transistors configured to provide an equalized output signal; contributing to the equalized output signal, a first current or voltage that has a magnitude determined by a feedback signal and one or more weighting signals using a first decision-feedback circuit that includes a first pullup circuit coupled between a drain of a first input transistor and a first voltage rail, and a first pulldown circuit coupled between the drain of the first input transistor and a second voltage rail; and contributing to the equalized output signal, a second current or voltage that has a magnitude determined by the feedback signal and the one or more weighting signals using a second decision-feedback circuit that includes a second pullup circuit coupled between a drain of a second input transistor and the first voltage rail, and a second pulldown circuit coupled between the drain of the second input transistor and a second voltage rail.

20. The method as described in clause 19, wherein the first pullup circuit and the second pulldown circuit are enabled when the feedback signal is in a first signaling state, and wherein the first pulldown circuit and the second pullup circuit are enabled when the feedback signal is in a second signaling state.

21. The method as described in clause 19 or clause 20, further comprising: calibrating the first weighting signal and the second weighting signal, during a system initialization or training procedure.

22. The method as described in any of clauses 19-21, wherein the first weighting signal or the second weighting signal, is an analog signal.

23. The method as described in any of clauses 19-22, wherein the first weighting signal or the second weighting signal, is a multibit digital signal.

24. The method as described in any of clauses 19-23, further comprising: contributing to the equalized output signal, additional currents or voltages that have magnitudes determined by the feedback signal and the one or more weighting signals, wherein the first decision-feedback circuit further includes one or more additional decision-feedback circuits connected in parallel with the first decision-feedback circuit, each additional decision-feedback circuit comprising: an additional pullup circuit coupled between the drain of the first input transistor and the first voltage rail and configured to contribute, to the equalized output signal, a first additional current or voltage that has a magnitude determined by the feedback signal and a first additional weighting signal; and an additional pulldown circuit coupled between the drain of the first input transistor and the second voltage rail and configured to contribute, to the equalized output signal, a second additional current or voltage that has a magnitude determined by the feedback signal and a second additional weighting signal.

25. The method as described in any of clauses 19-24, further comprising: capturing signaling state of the equalized output signal during a first transmission interval to obtain a first decoded data bit.

26. The method as described in clause 25, wherein the feedback signal represents a second decoded data bit captured during a second transmission interval that preceded the first transmission interval.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A decision-feedback equalizer, comprising:
    a pair of input transistors configured to receive a differential data signal and further configured to provide an output signal;
    a first decision-feedback circuit responsive to a first feedback signal of a differential feedback input, the first decision-feedback circuit including:
        a first pullup circuit coupled between a drain of a first input transistor of the pair of input transistors and a first voltage rail and configured to contribute, to the output signal, a first current or voltage that has a magnitude determined by the first feedback signal and a first weighting signal; and
        a first pulldown circuit coupled between the drain of the first input transistor and a second voltage rail and configured to contribute, to the output signal, a second current or voltage that has a magnitude determined by the first feedback signal and a second weighting signal; and
    a second decision-feedback circuit responsive to a second feedback signal of a differential feedback input, the second decision-feedback circuit including:
        a second pullup circuit coupled between a drain of a second input transistor of the pair of input transistors and the first voltage rail and configured to contribute, to the output signal, a third current or voltage that has a magnitude determined by the second feedback signal and a third weighting signal; and
        a second pulldown circuit coupled between the drain of the second input transistor and the second voltage rail and configured to contribute, to the output signal, a fourth current or voltage that has a magnitude determined by the second feedback signal and a fourth weighting signal.

2. The decision-feedback equalizer of claim 1, wherein the first pullup circuit and the second pulldown circuit are enabled when the first feedback signal or the second feedback signal is in a first signaling state, and wherein the first pulldown circuit and the second pullup circuit are enabled when the first feedback signal or the second feedback signal is in a second signaling state.

3. The decision-feedback equalizer of claim 1, wherein the first weighting signal is a version of the third weighting signal and the second weighting signal is a version of the fourth weighting signal.

4. The decision-feedback equalizer of claim 1, wherein the first weighting signal, the second weighting signal, the third weighting signal and the fourth weighting signal are calibrated during a system initialization or training procedure.

5. The decision-feedback equalizer of claim 1, wherein the first weighting signal, the second weighting signal, the third weighting signal or the fourth weighting signal is an analog signal.

6. The decision-feedback equalizer of claim 1, wherein the first weighting signal, the second weighting signal, the third weighting signal or the fourth weighting signal is a multibit digital signal.

7. The decision-feedback equalizer of claim 1, further comprising:
    one or more additional decision-feedback circuits connected in parallel with the first decision-feedback circuit, each additional decision-feedback circuit having:
        an additional pullup circuit coupled between the drain of the first input transistor and the first voltage rail and configured to contribute, to the output signal, an additional current or voltage that has a magnitude determined by the first feedback signal and a first additional weighting signal; and
        an additional pulldown circuit coupled between the drain of the first input transistor and the second voltage rail and configured to contribute, to the output signal, an additional current or voltage that has a magnitude determined by the second feedback signal and a second additional weighting signal.

8. The decision-feedback equalizer of claim 1, further comprising:
    a latch circuit configured to output a first decoded data bit by capturing signaling state of the output signal during a first transmission interval.

9. The decision-feedback equalizer of claim 8, wherein the first feedback signal or the second feedback signal represents a second decoded data bit captured during a second transmission interval that preceded the first transmission interval.

10. A decision-feedback system, comprising:
    a first decision-feedback equalizer configured to receive a data signal and to provide a first output signal representative of a first data bit captured from the data signal; and
    a second decision-feedback equalizer configured to receive the data signal and to provide a second output signal representative of a second data bit captured from the data signal using weighted feedback received from the first decision-feedback equalizer,
    wherein the first decision-feedback equalizer comprises:
        a pair of input transistors configured to receive the data signal and to drive the first output signal;
        a first decision-feedback circuit responsive to a first feedback signal of a differential feedback input, the first decision-feedback circuit including:

a first pullup circuit coupled between a drain of a first input transistor of the pair of input transistors and a first voltage rail and configured to contribute, to the first output signal, a first current or voltage that has a magnitude determined by the first feedback signal and a first weighting signal; and a first pulldown circuit coupled between the drain of the first input transistor and a second voltage rail and configured to contribute, to the first output signal, a second current or voltage that has a magnitude determined by the first feedback signal and a second weighting signal; and a second decision-feedback circuit responsive to a second feedback signal of a differential feedback input, the second decision-feedback circuit including:

a second pullup circuit coupled between a drain of a second input transistor of the pair of input transistors and the first voltage rail and configured to contribute, to the second output signal, a third current or voltage that has a magnitude determined by the second feedback signal and a third weighting signal; and a second pulldown circuit coupled between the drain of the second input transistor and the second voltage rail and configured to contribute, to the second output signal, a fourth current or voltage that has a magnitude determined by the second feedback signal and a fourth weighting signal.

11. The decision-feedback system of claim 10, wherein the first pullup circuit and the second pulldown circuit are enabled when the first feedback signal or the second feedback signal is in a first signaling state, and wherein the first pulldown circuit and the second pullup circuit are enabled when the first feedback signal or the second feedback signal is in a second signaling state.

12. The decision-feedback system of claim 10, wherein the first weighting signal is a version of the third weighting signal and the second weighting signal is a version of the fourth weighting signal.

13. The decision-feedback system of claim 10, wherein the first weighting signal, the second weighting signal, the third weighting signal and the fourth weighting signal are calibrated during a system initialization or training procedure.

14. The decision-feedback system of claim 10, wherein the first weighting signal, the second weighting signal, the third weighting signal or the fourth weighting signal is an analog signal.

15. The decision-feedback system of claim 10, wherein the first weighting signal, the second weighting signal, the third weighting signal or the fourth weighting signal is a multibit digital signal.

16. The decision-feedback system of claim 10, further comprising:

one or more additional decision-feedback circuits connected in parallel with the first decision-feedback circuit, each additional decision-feedback circuit having:

an additional pullup circuit coupled between the drain of the first input transistor and the first voltage rail and configured to contribute, to the first output signal, an additional current or voltage that has a magnitude determined by the first feedback signal and a fifth weighting signal; and an additional pulldown circuit coupled between the drain of the first input transistor and the second voltage rail and configured to contribute, to the first output signal, an additional current or voltage that has a magnitude determined by the second feedback signal and a sixth weighting signal.

17. The decision-feedback system of claim 10, further comprising:

a latch circuit configured to capture the first output signal during a first transmission interval, wherein the latch circuit provides the second feedback signal.

18. The decision-feedback system of claim 10, wherein the first decision-feedback equalizer receives a differential signal representative of the second output signal, wherein the differential signal comprises complementary signals that are provided to the first decision-feedback circuit and the second decision-feedback circuit as the first feedback signal and the second feedback signal, respectively.

19. A method for equalizing a data signal, comprising:

providing a differential data signal to a pair of input transistors configured to provide an equalized output signal;

contributing to the equalized output signal, a first current or voltage that has a magnitude determined by a first feedback signal and one or more weighting signals using a first decision-feedback circuit that includes a first pullup circuit coupled between a drain of a first input transistor of the pair of input transistors and a first voltage rail, and a first pulldown circuit coupled between the drain of the first input transistor of the pair of input transistors and a second voltage rail; and contributing to the equalized output signal, a second current or voltage that has a magnitude determined by a second feedback signal and the one or more weighting signals using a second decision-feedback circuit that includes a second pullup circuit coupled between a drain of a second input transistor of the pair of input transistors and the first voltage rail, and a second pulldown circuit coupled between the drain of the second input transistor of the pair of input transistors and the second voltage rail, wherein the first feedback signal and the second feedback signal are received as a differential input.

20. The method of claim 19, wherein the first pullup circuit and the second pulldown circuit are enabled when the first feedback signal or the second feedback signal is in a first signaling state, and wherein the first pulldown circuit and the second pullup circuit are enabled when the first feedback signal or the second feedback signal is in a second signaling state.

21. The method of claim 19, further comprising:

calibrating the one or more weighting signals during a system initialization or training procedure.

22. The method of claim 19, wherein the one or more weighting signals include an analog signal.

23. The method of claim 19, wherein the one or more weighting signals include a multibit digital signal.

24. The method of claim 19, further comprising:

contributing to the equalized output signal, additional currents or voltages that have magnitudes determined by the first feedback signal and the one or more weighting signals, wherein the first decision-feedback circuit further includes one or more additional decision-feedback circuits connected in parallel with the first decision-feedback circuit, each additional decision-feedback circuit comprising:

an additional pullup circuit coupled between the drain of the first input transistor and the first voltage rail and configured to contribute, to the equalized output signal, a first additional current or voltage that has a magnitude determined by the first feedback signal and a first additional weighting signal; and an additional pulldown circuit coupled between the drain of the first input transistor and the second voltage rail and configured to contribute, to the equalized output signal, a second additional current or voltage that has a magnitude determined by the second feedback signal and a second additional weighting signal.

25. The method of claim 19, further comprising:
capturing signaling state of the equalized output signal during a first transmission interval to obtain a first decoded data bit.

26. The method of claim 25, wherein the first feedback signal or the second feedback signal represents a second decoded data bit captured during a second transmission interval that preceded the first transmission interval.

\* \* \* \* \*